US012004449B2

(12) United States Patent
Faust et al.

(10) Patent No.: US 12,004,449 B2
(45) Date of Patent: Jun. 11, 2024

(54) CONTROL SYSTEM FOR CONTROLLING FILLING MECHANISMS IN COMMUNICATION WITH A MOBILE DEVICE

(71) Applicant: Deere & Company, Moline, IL (US)

(72) Inventors: Jeremy J. Faust, Grimes, IA (US); Kellen O'Connor, Clive, IA (US)

(73) Assignee: Deere & Company, Moline, IL (US)

( * ) Notice: Subject to any disclaimer, the term of this patent is extended or adjusted under 35 U.S.C. 154(b) by 324 days.

(21) Appl. No.: 17/210,691

(22) Filed: Mar. 24, 2021

(65) Prior Publication Data

US 2022/0304231 A1 Sep. 29, 2022

(51) Int. Cl.
*A01D 43/00* (2006.01)
*A01B 69/04* (2006.01)
*A01D 43/07* (2006.01)
*G05D 1/00* (2006.01)

(52) U.S. Cl.
CPC ............ *A01D 43/07* (2013.01); *A01B 69/008* (2013.01); *G05D 1/0016* (2013.01); *G05D 1/0027* (2013.01); *G05D 1/0246* (2013.01); *G05D 1/0291* (2013.01); *G05D 2201/0201* (2013.01)

(58) Field of Classification Search
CPC .... A01D 43/07; A01B 69/008; G05D 1/0016; G05D 1/0027; G05D 1/0246; G05D 1/0291; G05D 2201/0201
See application file for complete search history.

(56) References Cited

U.S. PATENT DOCUMENTS

| | | | |
|---|---|---|---|
| 5,575,316 | A | 11/1996 | Pollklas |
| 5,749,783 | A | 5/1998 | Pollklas |
| 5,957,773 | A | 9/1999 | Olmsted et al. |
| 6,097,425 | A | 8/2000 | Bahnke et al. |
| 6,216,071 | B1 | 4/2001 | Motz |
| 6,587,772 | B2 | 7/2003 | Behnke |
| 7,877,181 | B2 | 1/2011 | Chervenka et al. |

(Continued)

FOREIGN PATENT DOCUMENTS

| | | |
|---|---|---|
| DE | 19647522 A1 | 5/1998 |
| DE | 202012103730 U1 | 10/2012 |

(Continued)

OTHER PUBLICATIONS

U.S. Appl. No. 17/321,584, filed May 17, 2021 Application and Drawings, 47 pages.

(Continued)

*Primary Examiner* — Truc M Do
(74) *Attorney, Agent, or Firm* — Kelly, Holt & Christenson; Joseph R. Kelly

(57) ABSTRACT

A fill control system on a harvester detects that a receiving vehicle is to be repositioned relative to the harvester. The fill control system generates a signal indicative of how the receiving vehicle is to be repositioned relative to the harvester. The harvester sends the signal to a mobile device that is remote from the harvester. A mobile device receives an indication from a fill control system on a harvester that indicates how a receiving vehicle is to be repositioned relative to the harvester. The mobile device controls a user interface mechanism to generate an output indicating how the receiving vehicle is to be repositioned relative to the harvester.

10 Claims, 16 Drawing Sheets

(56) References Cited

U.S. PATENT DOCUMENTS

| | | |
|---|---|---|
| 8,126,620 B2 | 2/2012 | Ringwald et al. |
| 8,499,537 B2 | 8/2013 | Correns et al. |
| 9,043,096 B2 | 5/2015 | Zielke et al. |
| 9,107,344 B2 | 8/2015 | Madsen et al. |
| 9,119,342 B2* | 9/2015 | Bonefas ................ A01D 75/02 |
| 9,188,986 B2 | 11/2015 | Baumann |
| 9,468,145 B2 | 10/2016 | Coppinger et al. |
| 9,642,305 B2 | 5/2017 | Nykamp et al. |
| 9,949,435 B2 | 4/2018 | Banks, Jr. et al. |
| 9,949,462 B2 | 4/2018 | Zimmerman |
| 9,973,710 B2 | 5/2018 | Boydens et al. |
| 10,264,723 B2 | 4/2019 | Gresch et al. |
| 10,299,433 B2 | 5/2019 | Biggerstaff et al. |
| 10,368,488 B2 | 8/2019 | Becker et al. |
| 10,609,864 B2 | 4/2020 | Conrad et al. |
| 10,830,634 B2 | 11/2020 | Blank et al. |
| 10,834,872 B2 | 11/2020 | Farley et al. |
| 2002/0082757 A1 | 6/2002 | Behnke |
| 2002/0083695 A1 | 7/2002 | Behnke et al. |
| 2003/0174207 A1 | 9/2003 | Alexia et al. |
| 2004/0004544 A1 | 1/2004 | Knutson |
| 2006/0240884 A1 | 10/2006 | Klimmer |
| 2007/0135190 A1 | 6/2007 | Diekhans |
| 2008/0083475 A1 | 4/2008 | Lamb |
| 2009/0044505 A1 | 2/2009 | Huster et al. |
| 2010/0042297 A1 | 2/2010 | Foster et al. |
| 2010/0066517 A1 | 3/2010 | Posselius et al. |
| 2010/0266377 A1 | 10/2010 | Yoder |
| 2010/0285855 A1 | 11/2010 | Chervenka et al. |
| 2010/0332051 A1 | 12/2010 | Kormann |
| 2011/0061762 A1 | 3/2011 | Madsen et al. |
| 2011/0213531 A1 | 9/2011 | Farley |
| 2011/0307149 A1 | 12/2011 | Pighi et al. |
| 2012/0215381 A1 | 8/2012 | Wang et al. |
| 2012/0215394 A1* | 8/2012 | Wang ................ A01D 41/1278 701/50 |
| 2012/0221213 A1 | 8/2012 | Seeger |
| 2012/0263560 A1 | 10/2012 | Diekhans et al. |
| 2012/0265412 A1 | 10/2012 | Diekhans et al. |
| 2012/0302299 A1 | 11/2012 | Behnke et al. |
| 2013/0166344 A1 | 6/2013 | Grothaus et al. |
| 2013/0231823 A1 | 9/2013 | Wang et al. |
| 2014/0082442 A1 | 3/2014 | Whetsel |
| 2014/0224377 A1 | 8/2014 | Bonefas |
| 2015/0168187 A1 | 6/2015 | Meyers |
| 2015/0245560 A1 | 9/2015 | Middelberg et al. |
| 2015/0264866 A1 | 9/2015 | Foster et al. |
| 2015/0308070 A1 | 10/2015 | Deines |
| 2016/0009509 A1 | 1/2016 | Bonefas et al. |
| 2016/0348324 A1 | 12/2016 | Engelmann et al. |
| 2017/0042088 A1 | 2/2017 | Nykamp et al. |
| 2017/0082442 A1 | 3/2017 | Anderson |
| 2017/0088147 A1 | 3/2017 | Tentinger et al. |
| 2017/0208742 A1 | 7/2017 | Ingibergsson et al. |
| 2017/0336787 A1 | 11/2017 | Pichlmaier et al. |
| 2018/0022559 A1 | 1/2018 | Knutson |
| 2018/0334136 A1* | 11/2018 | Chaston ................ G06V 20/56 |
| 2019/0261561 A1 | 8/2019 | Heitmann |
| 2019/0332987 A1 | 10/2019 | Marsolek et al. |
| 2020/0073543 A1 | 3/2020 | Koch et al. |
| 2020/0090094 A1 | 3/2020 | Blank |
| 2020/0128740 A1 | 4/2020 | Suleman |
| 2020/0133262 A1* | 4/2020 | Suleman ............ A01D 41/1217 |
| 2020/0178049 A1 | 6/2020 | Suleman |
| 2020/0214205 A1 | 7/2020 | De Smedt et al. |
| 2020/0319655 A1 | 10/2020 | Desai et al. |
| 2020/0325655 A1 | 10/2020 | Hageman et al. |
| 2023/0247942 A1 | 8/2023 | Jager et al. |

FOREIGN PATENT DOCUMENTS

| | | |
|---|---|---|
| DE | 102019202950 A1 | 9/2019 |
| EP | 1977640 B1 | 2/2011 |
| EP | 2311307 B1 | 12/2011 |
| EP | 2510775 A1 | 10/2012 |
| EP | 2798939 A1 | 11/2014 |
| EP | 2929773 B1 | 1/2018 |
| EP | 3315006 A1 | 5/2018 |
| EP | 3315007 A1 | 5/2018 |
| EP | 3643159 A1 | 4/2020 |
| EP | 3409097 B1 | 7/2020 |
| EP | 3760026 A1 | 1/2021 |
| EP | 3316218 B1 | 4/2021 |
| WO | 2011104085 A1 | 9/2011 |
| WO | 2015011237 A2 | 1/2015 |
| WO | 2020038810 A1 | 2/2020 |

OTHER PUBLICATIONS

U.S. Appl. No. 17/386,975, filed Jul. 28, 2021, Application and Drawings, 54 pages.
U.S. Appl. No. 17/360,291, filed Jun. 28, 2021, Application and Drawings, 43 pages.
U.S. Appl. No. 17/360,282, filed Jun. 28, 2021, Application and Drawings, 51 pages.
U.S. Appl. No. 17/196,023, filed Mar. 9, 2021, Application and Drawings, 53 pages.
U.S. Appl. No. 17/321,584 Office Action dated Oct. 31, 2022, 15 pages.
Extended European Search Repost and Written Opinion issued in European Patent Application No. 22177642.0 dated Nov. 11, 2022, 8 pages.
Extended European Search Report and Written Opinion issued in European Patent Application No. 22159163.9, dated Aug. 3, 2022, in 07 pages.
Extended European Search Report and Written Opinion issued in European Patent Application No. 22177644.6, dated Nov. 25, 2022, in 08 pages.
Extended European Search Report and Written Opinion Issued in European Patent Application No. 22156203.6, dated Jul. 2022, in 11 pages.
U.S. Appl. No. 17/321,584 Final Office Action dated Aug. 15, 2022, 35 pages.
Extended European Search Report issued in European Patent Application No. 22170901.7, dated Feb. 24, 2023, 10 pages.
Extended European Search Report issued in European Patent Application No. 22183092.0, dated Mar. 24, 2023, 10 pages.
U.S. Appl. No. 17/321,584 Office Action dated May 11, 2022, 34 pages.
U.S. Appl. No. 17/321,584 Office Action dated Jan. 25, 2022, 24 pages.
U.S. Appl. No. 17/321,584 Office Action dated Sep. 17, 2021, 25 pages.
U.S. Appl. No. 17/321,584 Non Final Office Action dated Feb. 13, 2023, 9 pages.
Non Final Office Action for U.S. Appl. No. 17/196,023 dated Sep. 21, 2023, 20 pages.
Notice of Allowance for U.S. Appl. No. 17/360,291 dated Oct. 4, 2023, 9 pages.
U.S. Appl. No. 17/360,291 Notice of Allowance dated Nov. 13, 2023, 5 pages.

* cited by examiner

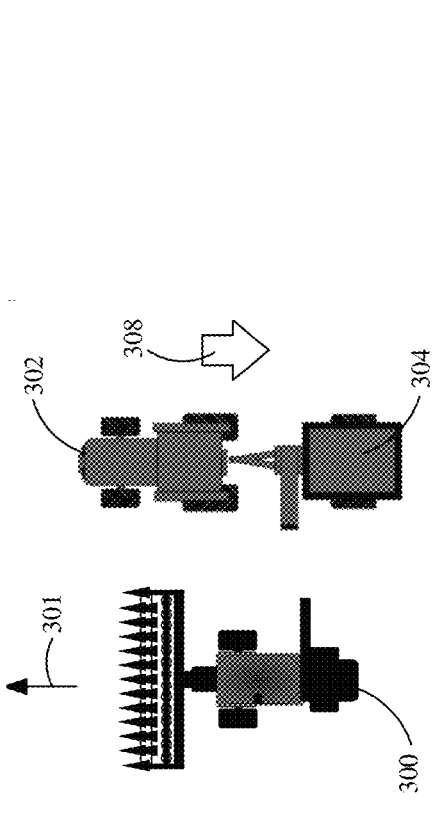
FIG. 7B
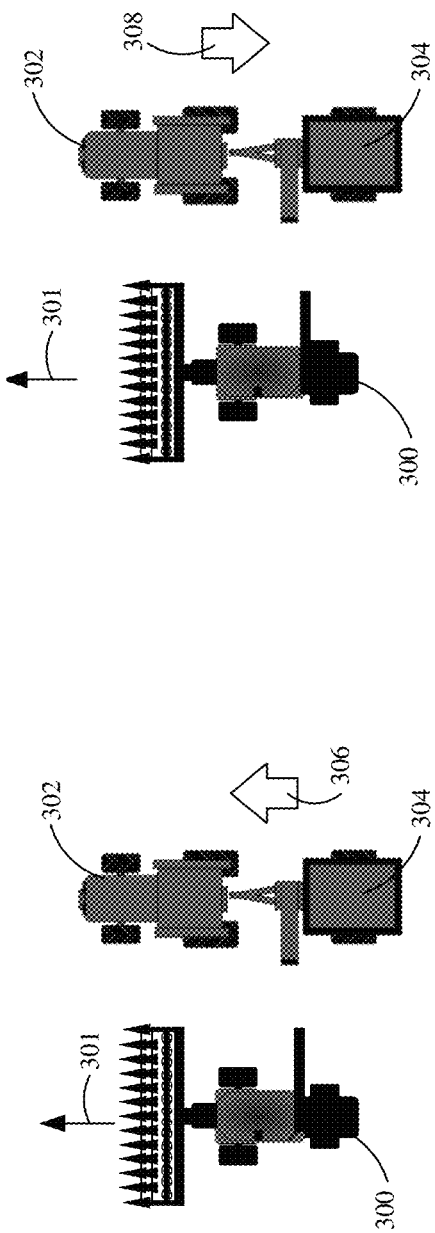
FIG. 7A
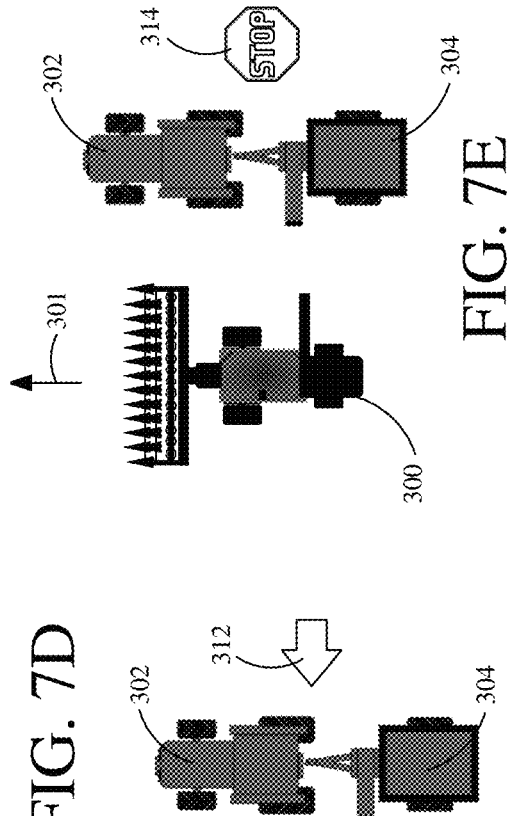
FIG. 7E
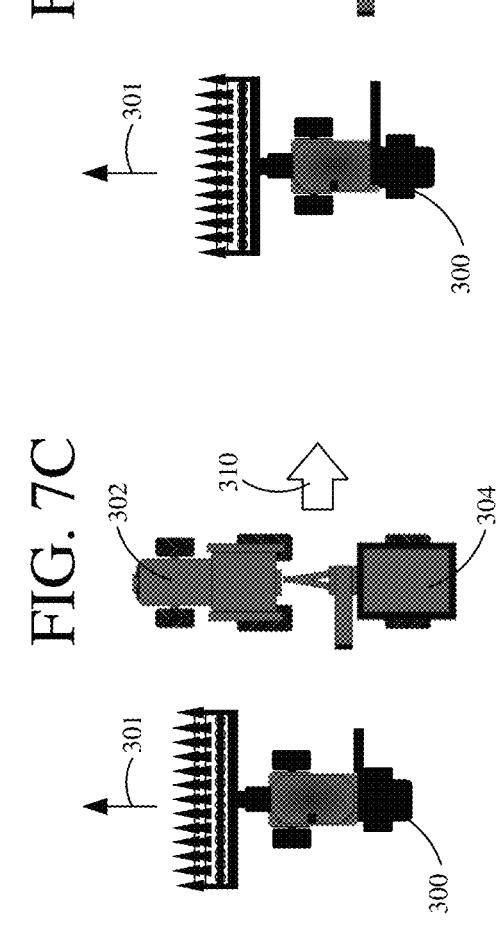
FIG. 7D
FIG. 7C

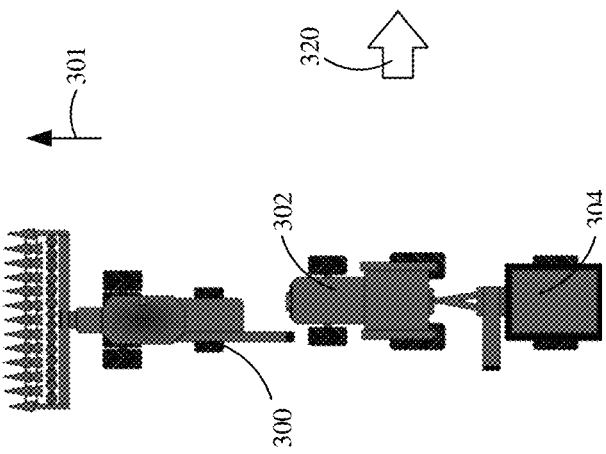
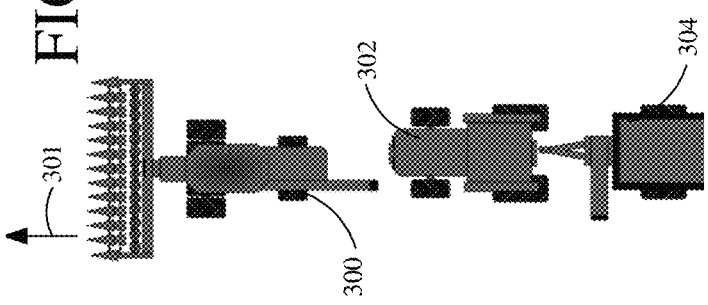
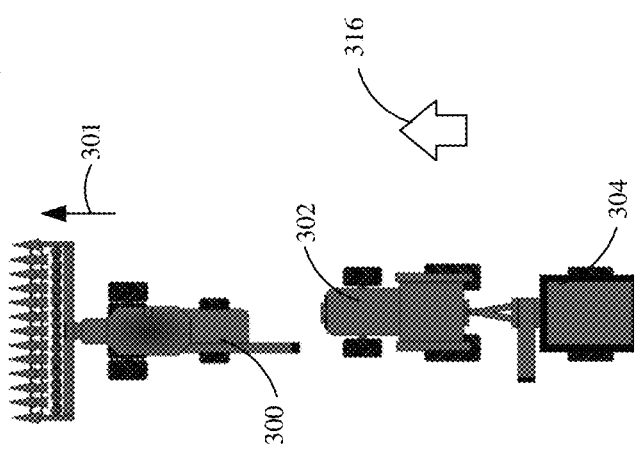

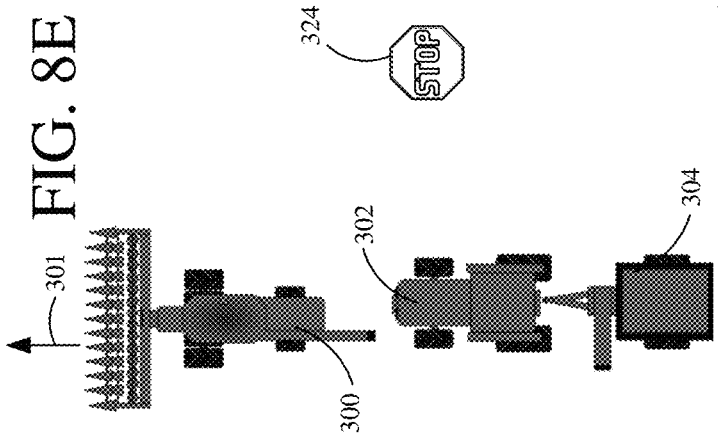
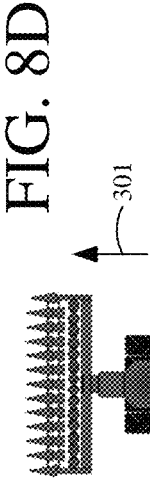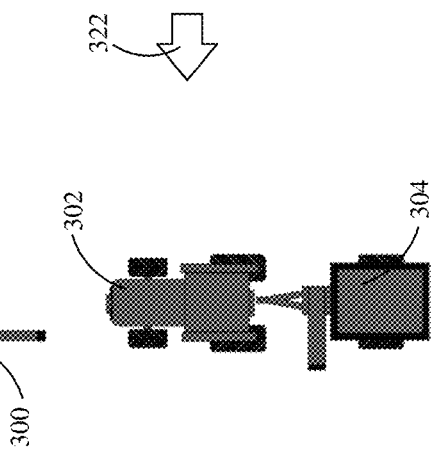

CONTROL SYSTEM FOR CONTROLLING FILLING MECHANISMS IN COMMUNICATION WITH A MOBILE DEVICE

FIELD OF THE DESCRIPTION

The present description relates to mobile work machines. More specifically, the present description relates to controlling placement of filling mechanisms when filling a receiving vehicle.

BACKGROUND

There are a wide variety of different types of mobile work machine such as agricultural vehicles and construction vehicles. Some vehicles include harvesters, such as forage harvesters, sugar cane harvesters, combine harvesters, and other harvesters, that harvest grain or other crop. Such harvesters often unload into carts which may be pulled by tractors or semi-trailers as the harvesters are moving. Some construction vehicles include vehicles that remove asphalt or other similar materials. Such machines can include cold planers, asphalt mills, asphalt grinders, etc. Such construction vehicles often unload material into a receiving vehicle, such as a dump truck or other vehicle with a receiving vessel.

As one example, while harvesting in a field using a forage harvester, an operator attempts to control the forage harvester to maintain harvesting efficiency, during many different types of conditions. The soil conditions, crop conditions, and other things can all change. This may result in the operator changing control settings. This means that the operator needs to devote a relatively large amount of attention to controlling the forage harvester.

At the same time, a semi-truck or tractor-pulled cart is often in position relative to the forage harvester (e.g., behind the forage harvester or alongside the forage harvester) so that the forage harvester can fill the truck or cart while moving through the field. In some current systems, this requires the operator of the forage harvester to control the position of the unloading spout and flap so that the truck or cart is filled evenly, but not overfilled. Even a momentary misalignment between the spout and the truck or cart may result in hundreds of pounds of harvested material being dumped on the ground, or elsewhere, rather than in the truck or cart.

The receiving vehicle often has more freedom to move relative to the harvester than the harvester has to slow down or speed up due to crop unloading. Thus, the operators of the receiving vehicle currently attempt to adjust to the harvester so that the receiving vehicles are filled evenly, but not overfilled. However, it can be difficult for the operator of the receiving vehicle to adequately adjust the position of the receiving vehicle, relative to the harvester, to accomplish a desired fill strategy. Further, the operator of the harvester may unexpectedly stop the harvester (such as when the harvester head becomes clogged and needs to be cleared or for other reasons), so the operator of the receiving vehicle may not react quickly enough, and the receiving vehicle may thus be out of position relative to the harvester.

Other harvesters such as combine harvesters and sugar cane harvesters, can have similar difficulties. Also, construction vehicles can be difficult to operate while attempting to maintain alignment with a receiving vehicle.

The discussion above is merely provided for general background information and is not intended to be used as an aid in determining the scope of the claimed subject matter.

SUMMARY

A fill control system on a harvester detects that a receiving vehicle is to be repositioned relative to the harvester. The fill control system generates a signal indicative of how the receiving vehicle is to be repositioned relative to the harvester. The harvester sends the signal to a mobile device that is remote from the harvester.

A mobile device receives an indication from a fill control system on a harvester that indicates how a receiving vehicle is to be repositioned relative to the harvester. The mobile device controls a user interface mechanism to generate an output indicating how the receiving vehicle is to be repositioned relative to the harvester.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 7A-7E show examples of user interface displays.

FIGS. 8A-8E show examples of user interface displays.

DETAILED DESCRIPTION

Figure 1:
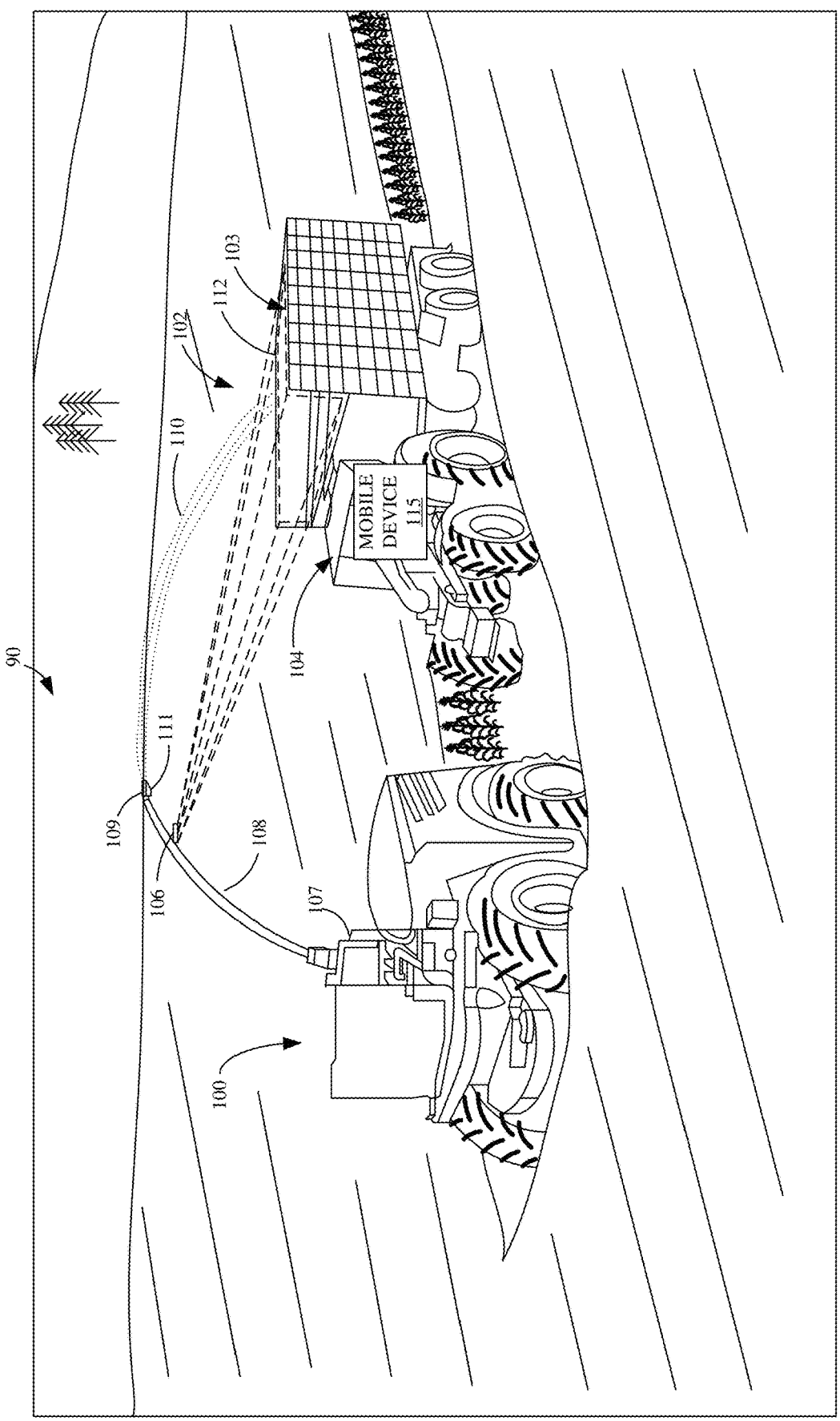
FIG. 1 is a pictorial illustration of one example of a work machine which comprises a forage harvester filling a receiving vehicle, with the receiving vehicle in a position behind the forage harvester.

The present discussion proceeds with respect to an agricultural harvester, but it will be appreciated that the present discussion is also applicable to construction machines or other material loading vehicles as well, such as those discussed elsewhere herein. As discussed above, it can be very difficult for an operator to maintain high efficiency in controlling a harvester, and also to optimally monitor the position of the receiving vehicle. This difficulty can even be exacerbated when the receiving vehicle is located behind the forage harvester, so that the forage harvester is executing a rear unloading operation, but the difficulty also exists in side-by-side unloading scenarios.

In order to address these issues, some automatic cart filling control systems have been developed to automate portions of the filling process. One such automatic fill control system uses a stereo camera on the spout of the harvester to capture an image of the receiving vehicle. An image processing system determines dimensions of the receiving vehicle and the distribution of the crop deposited inside the receiving vehicle. The system also detects crop height within the receiving vehicle, in order to automatically aim the spout toward empty spots and control the flap position to achieve a more even fill, while reducing spillage. Such systems can fill the receiving vehicle according to a fill strategy (such as front-to-back, back-to-front, etc.) that is set by the operator or that is set in other ways.

However, even with such automatic fill control systems, there can be occasions where the system does not fill in a uniform manner using the desired fill strategy. For instance, there may be times when the spout cannot be controlled so that it reaches the area of the receiving vessel where the system wishes to perform the fill operation. For instance, assume that the automatic fill control system wishes to command the spout to begin filling at the rear of a receiving vehicle according to a back-to-front fill strategy. It may be that the receiving vehicle is positioned in a spot, relative to the harvester, such that the spout cannot be commanded to fill the extreme rear of the receiving vehicle. This means that the cart cannot be filled correctly or fully by the automatic fill control system.

Even when the operator of the harvester knows that the harvester should move forward or backward relative to the receiving vehicle, this may not always address the problem. For instance, the harvester may be starved for horsepower or it may be fully loaded so that it cannot adjust speed to meet the demands of positioning the spout as commanded by the automatic fill control system. Similarly, the operator of the harvester may be preoccupied in watching the harvesting head for clogs so that attempting to reposition the harvester relative to the receiving vehicle can be quite difficult.

In addition, some current harvesters are provided with a machine synchronization control system. The harvester may be a combine harvester so that the spout is not movable relative to the frame during normal unloading operations. Instead, the relative position of the receiving vehicle and the combine harvester is changed in order to fill the receiving vehicle as desired. Thus, in a front-to-back fill strategy, for instance, the relative position of the receiving vehicle, relative to the combine harvester, is changed so that the spout is first filling the receiving vehicle at the front end, and then gradually fills the receiving vehicle moving rearward. In such an example, the combine harvester and receiving vehicle may have machine synchronization systems which communicate with one another. When the relative position of the two vehicles is to change, the machine synchronization system on the combine harvester can send a message to the machine synchronization system on the towing vehicle to nudge the towing vehicle slightly forward or rearward relative to the combine harvester, as desired. By way of example, the machine synchronization system on the combine harvester may receive a signal from the fill control system on the combine harvester indicating that the position in the receiving vehicle that is currently being filled is approaching its desired fill level. In that case, the machine synchronization system on the combine harvester can send a "nudge" signal to the machine synchronization system on the towing vehicle. The "nudge", once received by the machine synchronization system on the towing vehicle, causes the towing vehicle to momentarily speed up or slow down, thus nudging the position of the receiving vehicle forward to rearward, respectively, relative to the combine harvester.

However, this type of machine synchronization system is normally implemented on a subset of towing vehicles or other receiving vehicles that are used for harvesting operations. Older vehicles, for instance, may not be fitted with such a system.

Thus, the operator of the receiving vehicle may attempt to manually change the position of the receiving vehicle relative to the harvester in order to execute a desired fill strategy. This requires the operator of the receiving vehicle to know the fill strategy that the operator of the harvester would like to perform. Similarly, since the operator of the receiving vehicle often cannot see his or her cart fill height, the operator of the receiving vehicle must estimate when the fill level is adequate in order to change the position of the receiving vehicle relative to the harvester. This results in frequent missteps in which the operator of the receiving vehicle changes the position of the receiving vehicle relative to the harvester prematurely, so that the trailer is not sufficiently full, or too late, which can result in the trailer being overfilled and can result in spillage.

The present discussion thus proceeds with respect to a system in which an automatic fill control system on the harvester includes a camera and image processing system that can be used to identify the fill level at a current landing position in the receiving vehicle. When the fill level reaches a desired fill level so that the position of the receiving vehicle should change, relative to the position of the harvester, then an indicator is generated by the automatic fill control system on the harvester and that indicator is sent to a remote mobile device (which may be carried by the operator of the receiving vehicle or mounted in the operator compartment of the receiving vehicle). The mobile device generates a display or other operator perceptible output that indicates how the position of the receiving vehicle should change relative to the position of the harvester.

For instance, in one example, the mobile device can generate an output showing an arrow or other direction indicator that indicates how the position of the receiving vehicle should change relative to the position of the harvester. In another example, the camera on the harvester captures streaming video of the harvested material entering the receiving vehicle. That streaming video is sent to the mobile device so that it can be displayed on the mobile device. The indicators, which indicate how the position of the receiving vehicle should change relative to the position of the harvester, can also be sent and overlaid on top of, or otherwise integrated into, the streaming video. These are examples only and other examples of indicators showing how the relative position of the receiving vehicle and the harvester should change and that can be sent to the remote mobile device are described below.

FIG. 1 is a pictorial illustration showing one example of a self-propelled forage harvester 100 (a material loading vehicle) filling a tractor-pulled grain cart (or receiving vehicle) 102. Cart 102 thus defines an interior that forms a receiving vessel 103 for receiving harvested material through a receiving area 112. In the example shown in FIG. 1, a towing vehicle (e.g., a tractor) 104, that is pulling grain cart 102, is positioned directly behind forage harvester 100 and has a mobile device 115 which may be a smart phone, tablet computer, etc. either mounted in the operator compartment of tractor 104, or carried by the operator of tractor 104. Also, in the example illustrated in FIG. 1, forage harvester 100 has a camera 106 mounted on the spout 108 through which the harvested material 110 is traveling. The spout 108 can be pivotally or rotationally mounted to a frame 107 of harvester 100. Camera 106 can be a stereo-camera or a mono-camera that captures an image (e.g., a still image or video) of the receiving area 112 of cart 102. In the example shown in FIG. 1, the receiving area 112 is defined by an upper edge of the walls of cart 102.

When harvester 100 has an automatic fill control system that includes image processing, as discussed above, the automatic fill control system can gauge the height of harvested material in cart 102, and the location of that material. The system thus automatically controls the position of spout 108 and flap 109 to direct the trajectory of material 110 into the receiving area 112 of cart 102 to obtain an even fill throughout the entire length and width of cart 102, while not overfilling cart 102. By automatically, it is meant, for example, that the operation is performed without further human involvement except, perhaps, to initiate or authorize the operation.

For example, when executing a back-to-front automatic fill strategy the automatic fill control system may attempt to move the spout and flap so the material begins landing at a first landing point in the back of vessel 103. Then, once a desired fill level is reached in the back of vessel 103, the automatic fill control system moves the spout and flap so the material begins landing just forward of the first landing point in vessel 103.

There can be problems with this approach. The trailer 102 may be so far behind harvester 100 that the spout 108 and flap 109 cannot be positioned properly so the harvested material cannot reach the back of trailer 102. Further, the operator of towing vehicle 104 may not be able to see the level of material in trailer 102 and may therefore be unable to accurately reposition trailer 102 relative to harvester 100. Thus, it may be difficult to fill trailer 102 efficiently. Also, the operator of harvester 100 may need to stop harvester 100 to clear the head of harvester 100 or for some other reason. However, this may be unknown to the operator of towing vehicle 104. When harvester 100 stops, vehicle 104 may move forward too far so that material is either placed too far back in trailer 102 or completely clears the back of trailer 102 and lands on the ground.

Figure 2:
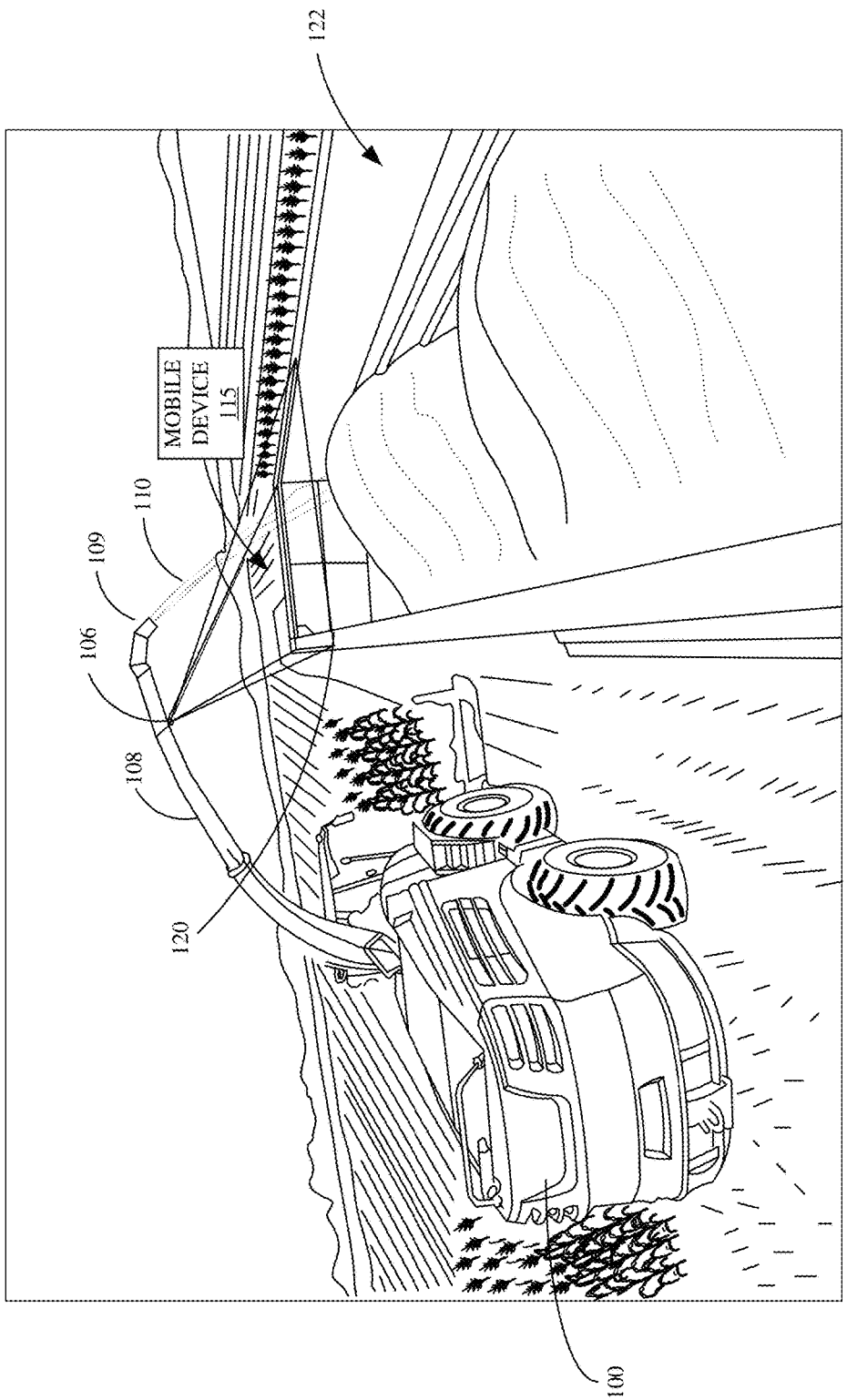
FIG. 2 is a pictorial illustration of one example of a work machine which comprises a forage harvester filling a receiving vehicle that is alongside the forage harvester.

FIG. 2 is a pictorial illustration showing another example of a self-propelled forage harvester 100, this time loading a semi-trailer (or receiving vessel on a receiving vehicle) 122 in a configuration in which a semi-tractor (that also has a mobile device 115) is pulling semi-trailer 122 alongside forage harvester 100. Therefore, the spout 108 and flap 109 are positioned to unload the harvested material 110 to fill trailer 122 according to a pre-defined side-by-side fill strategy. Again, FIG. 2 shows that camera 106 can capture an image (which can include a still image or video) of semi-trailer 122. In the example illustrated in FIG. 2, the field of view of camera 106 is directed toward the receiving area 120 of trailer 122 so that image processing can be performed to identify a landing point for the harvested material in trailer 122.

In other examples, where machine 100 is a combine harvester, it may be that the spout 108 is not moved relative to the frame during normal unloading operations. Instead, the relative position of the receiving vehicle 102, 122 and the combine harvester is changed in order to fill the receiving vessel 103 as desired. Thus, if a front-to-back fill strategy is to be employed, then the relative position of the receiving vessel, relative to the combine harvester, is changed so that the spout is first filling the receiving vessel at the front end, and then gradually fills the receiving vessel moving rearward. In such an example, the towing vehicle may not have any type of machine synchronization systems, as discussed above. Thus, it can be difficult for the harvester and the towing vehicle to communicate with one another. The operator of the towing vehicle often estimates when the relative position of the two vehicles is to change, in order to fill the receiving vehicle as desired. Sometimes the operators use horns or radios to try to communicate with one another but this can be ambiguous and confusing, especially when more than one harvester is operating in a field.

Referring again to the examples discussed above with respect to FIGS. 1 and 2, the present discussion proceeds with respect to an example in which a mobile device 115 (such as a smartphone, a tablet computer, etc.) is accessible by the operator of the receiving vehicle (e.g., the driver of the towing vehicle or semi-tractor). The mobile device 115 may be mounted within the operator compartment of the receiving vehicle, carried by the operator, or otherwise accessible by the operator. A fill control system on harvester 100 sends the mobile device an indication that the position of the receiving vehicle, relative to the harvester, should change, and a direction of how the relative position should change. The mobile device 115 then surfaces an indicator to the operator of the receiving vehicle or towing vehicle indicating how to reposition the receiving vehicle relative to the harvester, as described in greater detail below.

Figure 3:
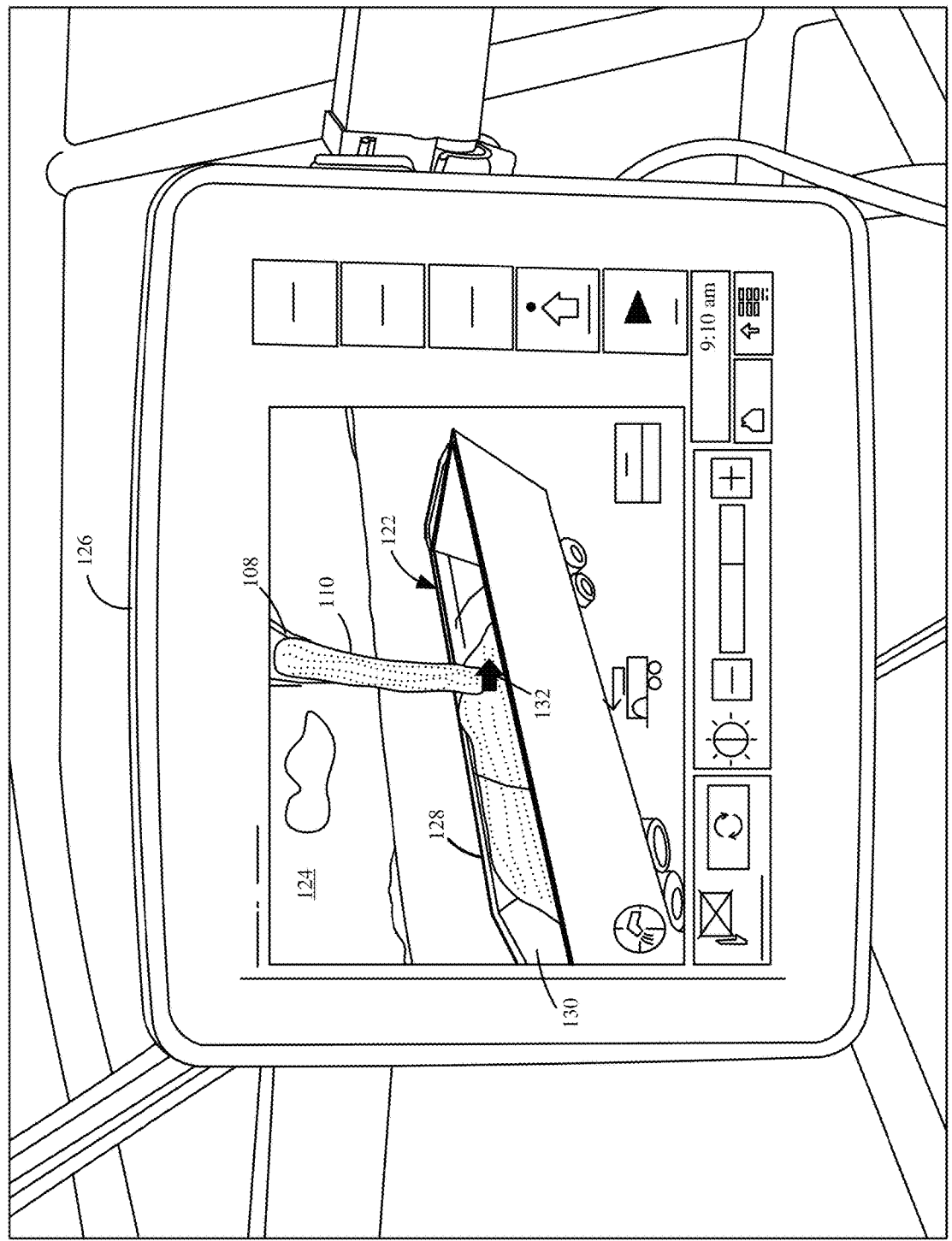
FIG. 3 is a pictorial illustration of an operator display showing video of a filling operation.

FIG. 3 is a pictorial illustration showing one example of an operator interface display 124 that can be displayed on a display mechanism 126, for the operator in an operator compartment of forage harvester 100. The display (or portion of it) can also be sent to the mobile device 115 for use by the operator of the receiving vehicle or towing vehicle (tractor 104 or the semi-tractor). The operator interface display 124 in FIG. 3 shows a view of images (or video) captured by camera 106. The image(s) show material 110 entering trailer 122. An image processing system on harvester 100 illustratively identifies the perimeter of the opening 128 in trailer 122 and also processes the image of the material 110 in trailer 122 to determine the fill height relative to opening 128. The perimeter defining opening 128 can be visually enhanced by overlaying a visual overlay over the opening 128 so that the operator can easily identify the opening 128, as it is being recognized by the image processing system.

In some cases the operator sees that, while the material 110 is generally filling trailer 122 evenly, there may be voids in the trailer 122, such as a void 130 at the forward end of trailer 122. In that case, it may be that the operator wishes to fill void 130 with more material before continuing to fill the remainder of trailer 122. Similarly, there may be other reasons that the operator wishes to reposition the spout 108 relative to the receiving vessel 103. Thus, as is discussed in greater detail below, a fill control system allows the operator to use a touch gesture (or other command input, such as a point and click input) selecting the area of trailer 122 on display 124 that corresponds to the void 130. The fill control system also allows the operator to provide an input through interface 124, marking a location (such as the location of void 130) where material 110 is to be directed. However, it may also be that the receiving vessel 103 is in a position relative to harvester 100 such that spout 108 cannot be moved to fill the area of the void 130. For instance, with reference to FIG. 3, it may be that receiving vessel 103 is so far forward relative to spout 108 that spout 108, even when moved to its extreme forward position, cannot be properly positioned to fill void 130. In that case, the operator of the receiving vessel can be notified that he or she needs to reposition the receiving vessel 103 relative to the harvester 100.

For example, where the display screen on mechanism 126 is a touch sensitive display screen, then the operator of harvester 100 may simply touch the screen in the area of void 130. The touch gesture is detected by the fill control system and the fill control system automatically generates control signals to send an indicator to the mobile device 115 on the receiving vehicle indicating that the position of the receiving vehicle relative to the harvester needs to change.

Generating the control signals to send an indicator to the mobile device 115 can be done in different ways. For instance, once the operator touches or otherwise selects (such as with a point and click device) an area of display 124, the control system identifies the pixel or pixel sets that were selected (e.g., touched or otherwise selected) and, from those pixels, identifies a corresponding physical area or landing point within trailer 122. The control system can then calculate the position that the receiving vessel 103 needs to be in order to direct material 110 to that particular landing point in trailer 122. The control system can then generate an indicator that is output to the mobile device so an application on the mobile device 115 can generate an output for the operator of the receiving vehicle indicating that the receiving vehicle needs to move forward, backward, inward, or outward relative to harvester 100, or to stop. The indicator may be an arrow on the mobile device display showing the direction of position adjustment that is to be made, streaming video showing the fill level of the receiving vessel 103, or other audio, visual, or haptic indicators, some of which are discussed below.

It should also be noted that, in one example, forage harvester 100 may have an automatic fill control system (or active fill control system) which fills trailer 122 according to a fill strategy (such as a back-to-front fill strategy, front-to-back fill strategy, etc.). In that case, a current location indicator (such as indicator 132) may be displayed to show the current location where material 110 is being loaded into trailer 122 through spout 108 and the direction that spout 108 is, or should be, moving relative to trailer 122 as the filling operation continues. It can be seen in FIG. 3, for instance, that indicator 132 is an arrow pointing in the front-to-back direction. The location of arrow 132 on the representation of trailer 122 indicates the current fill position, while the direction of the arrow 132 indicates the direction that spout 108 will be moved relative to trailer 122 in executing the selected front-to-back fill strategy. Therefore, in one example, the streaming video and indicator 132 can be sent to mobile device 115 so the operator of the receiving vehicle can easily see the fill level in the trailer 122, and the direction that trailer 122 needs to move relative to the harvester in order to execute an efficient filling operation. While the indicator 132 in FIG. 2 points in the direction that spout 108 is to move relative to trailer 122, the indicator can also be reversed when shown on mobile device 115 to show the direction that the trailer 122 (and hence receiving vehicle 102) is to move relative to harvester 100. These are just some examples of how the operator interface display 124 can be generated, and other examples are also contemplated herein.

Figure 4:
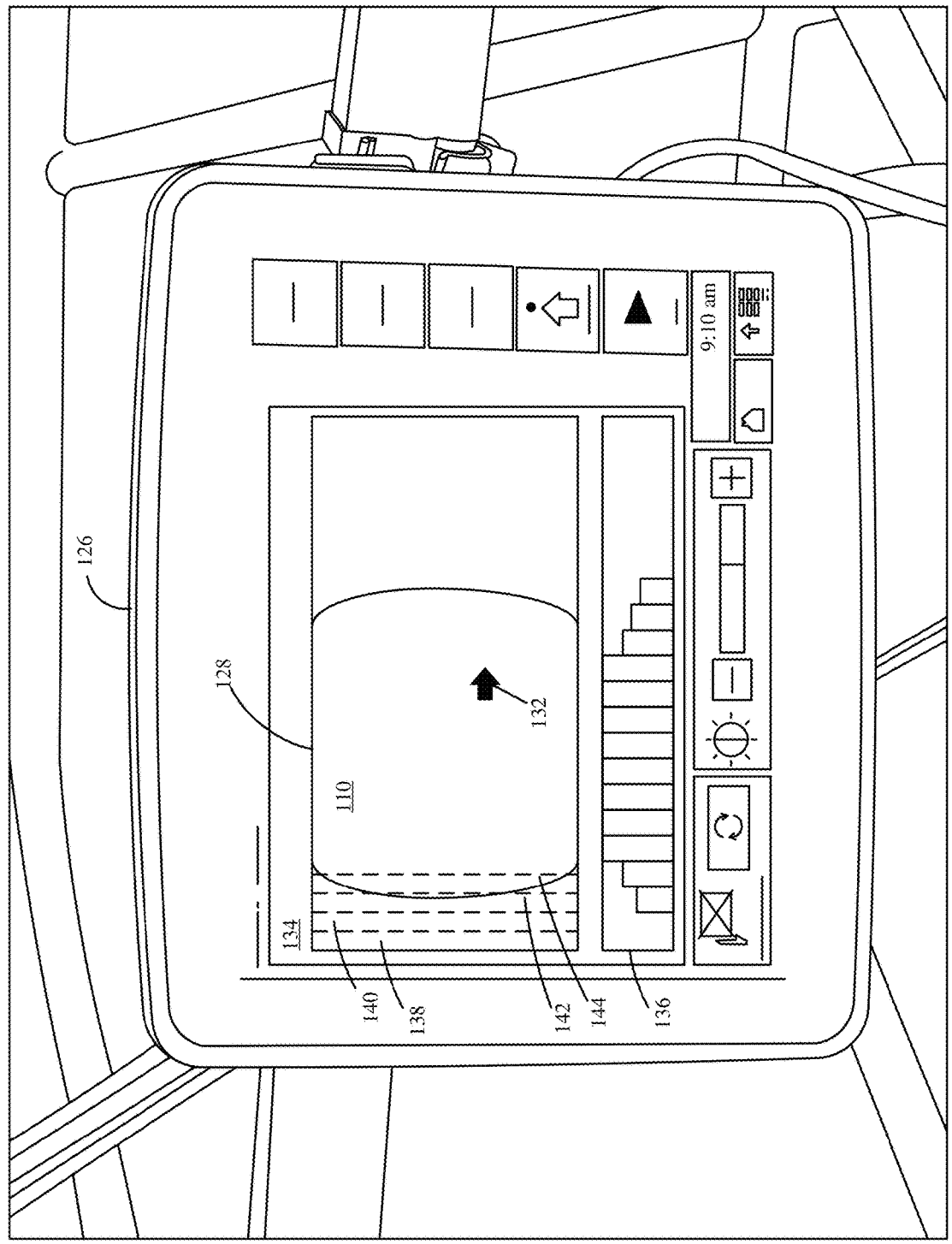
FIG. 4 is a pictorial illustration of an operator display showing a top down representation of a receiving vessel and a graphical illustration of a fill level in the receiving vessel.

FIG. 4 is another example of an operator interface display 134 which can be generated for the operator of harvester 100 and/or sent to mobile device 115. Some items are similar to those shown in FIG. 3 and they are similarly numbered. Display 134 is a representation of a top-down view of trailer 122. The top-down view is accompanied by a graph 136 that illustrates the fill level of the different portions of trailer 128. By way of example, image processing can divide the area of the trailer 128 into bins or discrete volumes (some of which are illustrated by the dashed lines in FIG. 4). FIG. 4 shows that the bins 138, 140, 142, and 144 correspond to volumes defined by cross sections of the trailer 128. Each of the bins has a corresponding bar in graph 136, indicating the fill level of that bin in trailer 128. The bar graphs corresponding to bins 138 and 140 are at zero showing that there is no material 110 at those locations in trailer 128. The bar graphs corresponding to bins 142 and 144 show increasing levels of material 110 in those bins. The location of the bins may be displayed on display 134, or they may be hidden. Information indicative of the display 134, or parts of it, can be sent to mobile device 115 so the operator of the receiving vehicle can see the fill level of various portions of the receiving vessel and/or see an indicator showing which direction the receiving vehicle should move relative to the harvester 100 in order to execute a desired fill strategy.

In the example shown in FIG. 4, the operator may see that the location of trailer 122 corresponding to bins 138 and 140 is empty. In that case, the operator may provide a reposition command input (such as tapping or touching the display 134 in the area of bin 138 or 140) to indicate that the operator desires to have the spout 108 repositioned to a location which fills the volume corresponding to the selected bin in trailer 122. For instance, assume that the operator taps the display 124 in the area of bin 138. In that case, the control system automatically sends an indicator to mobile device 115 indicating the commanded change of position. The indicator can be an arrow, the streaming video with the arrow overlayed on or otherwise integrated into it, a pictorial representation with the arrow overlayed or otherwise integrated, or another audible, visual, and/or haptic indicator. This information can be sent to mobile device 115 so the operator of the receiving vehicle can adjust the position of the receiving vessel 103 relative to spout 108 to fill in the area of bins 138 and 140. In one example, once the operator enters a command (such as by tapping the location of a bin on the display 124 or by tapping indicator 132) the control system translates that pixel location into a physical bin location on trailer 122 and generates the information that is provided to mobile device 115 indicating the commanded adjustment of the position of the receiving vehicle relative to the harvester.

Figure 5:
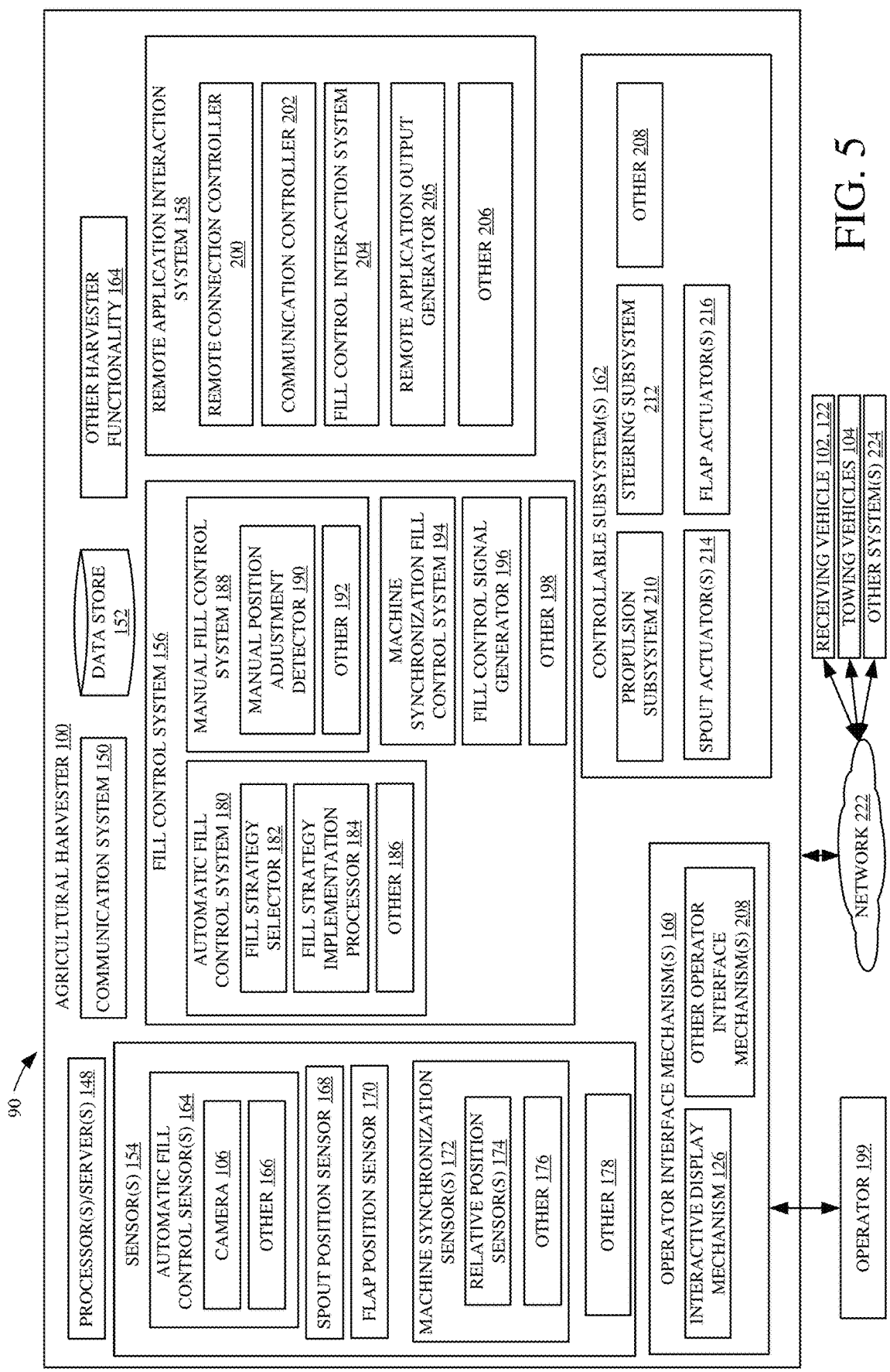
FIG. 5 is a block diagram of one example of a harvester.

FIG. 5 is a block diagram showing one example of a material loading system (an agricultural system) 90 that includes mobile material loading machine which comprises agricultural harvester 100 in more detail. Agricultural harvester 100, in the example shown in FIG. 5, includes one or more processors or servers 148, communication system 150, data store 152, sensors 154, fill control system 156, remote application interaction system 158, operator interface mechanisms 160, controllable subsystems 162, and other harvester functionality 164. Sensors 154 can include automatic fill control sensors 164 that are used by fill control system 156. Sensors 164 can include camera 106 (which may be a mono-camera, stereo-camera or another type of camera) and other sensors 166. The other sensors can include such things as Doppler sensors, RADAR sensors, other image sensors or any of a wide variety of other types of sensors. Sensors 154 can also include spout position sensor 168 and flap position sensor 170. Spout position sensor 168 illustratively senses the position of spout 108 relative to the frame of harvester 100. Sensor 168 can do this by sensing the position of an actuator that drives movement of spout 108 relative to the frame of harvester 100, or sensor 168 can be a rotary position sensor, a linear sensor, a potentiometer, a Hall Effect sensor, or any other of a wide variety of sensors that can sense the position of spout 108 relative to the frame of harvester 100. Similarly, flap position sensor 170 can be a sensor that senses the position of the flap 109. Thus, sensor 170 can be a rotary position sensor, a linear sensor, a potentiometer, a Hall Effect sensor, a sensor that senses a position of an actuator that drives movement of flap 109, or any of a wide variety of other sensors.

Sensors 154 can also include machine synchronization sensors 172. Sensors 172 can include relative position sensors 174 that sense the relative position of the harvester 100, relative to the receiving vehicle. Such sensors can include RADAR sensors, Doppler sensors, image or other optical sensors, or a wide variety of other relative position sensors. The relative position sensors 174 can also include position sensors (such as a GPS receiver, or another GNSS sensor) that senses the position of harvester 100. This can be used, in conjunction with another position sensor signal from a position sensor on the receiving vehicle, to determine the position of the two vehicles relative to one another. The machine synchronization sensors 172 can include other sensors 176, and sensors 154 can include a wide variety of other sensors 178 as well.

Fill control system 156 illustratively controls operations of various parts of harvester 100 (and possibly the towing vehicle 104) to fill the receiving vehicle 102, 122, as desired. Fill control system 156 can include automatic fill control system 180 (which, itself, can include fill strategy selector 182, fill strategy implementation processor 184 and other items 186), manual fill control system 188 (which, itself can include manual position adjustment detector 190 and other items 192), and/or machine synchronization fill control system 194. Fill control system 156 can also include fill control signal generator 196 and other items 198.

Remote application interaction system 158 can include connection controller 200, communication controller 202, fill control interaction system 204, remote application output generator 205, and other items 206. Operator interface mechanisms 160 can include interactive display mechanism 126 and a variety of other operator interface mechanisms 208. Controllable subsystems 162 can include propulsion subsystem 210, steering subsystem 212, one or more spout actuators 214, one or more flap actuators 216 and other items 218. FIG. 5 also shows that operator 220 can interact through operator interface mechanism 160 to control and manipulate agricultural harvester 100. Further, FIG. 5 shows that harvester 100 is connected over network 222 to receiving vehicle 102, 122, towing vehicle 104 and/or it can be connected to other systems 224. Before describing the overall operation of agricultural harvester 100 in more detail, a brief description of some of the items in agricultural harvester 100, and their operation, will first be provided.

Communication system 150 can facilitate communication among the items of harvester 100 and with other items over network 222. Network 222 can be a wide area network, a local area network, a near field communication network, a Bluetooth communication network, a cellular communication network, or any of a variety of other networks or combinations of networks. Therefore, communication system 150 can use a controller area network (CAN) bus or other controllers to facilitate communication of the items on harvester 100 with other items. Communication system 150 can also be different kinds of communication systems, depending on the particular network or networks 222 over which communication is to be made.

Operator interface mechanisms 160 can be a wide variety of different types of mechanisms. Interactive display mechanism 126 can be a display mechanism, such as that shown in FIGS. 3 and 4, or mechanism 126 can be a display mechanism on a mobile device, such as a tablet computer, a smartphone, etc., that is carried by the operator 199 and/or mounted in the operator compartment of harvester 100. Thus, interactive display mechanism 126 can be a touch sensitive display mechanism, a display mechanism that receives inputs through a point and click device, or other kinds of display mechanisms.

Other operator interface mechanisms 208 can include a steering wheel, levers, buttons, pedals, a microphone and speaker (where speech recognition and speech synthesis are provided), joysticks, or other mechanical, audio, visual, or haptic mechanisms that can be used to provide outputs to operator 199 or to receive inputs from operator 199.

Controllable subsystems 162 can be controlled by various different items on harvester 100. Propulsion subsystem 210 can be an engine that drives ground-engaging elements (such as wheels or tracks) through a transmission, hydraulic motors that are used to drive ground-engaging elements, electric motors, direct drive motors, or other propulsion systems that are used to drive ground-engaging elements to propel harvester 100 in the forward and rearward directions. Propulsion subsystem 110 can illustratively be controlled with a throttle to increase or decrease the speed of travel of harvester 100.

Steering subsystem 212 can be used to control the heading of harvester 100. One or more spout actuators 214 are illustratively configured to drive rotation or movement of spout 108 relative to the frame of harvester 100. Actuators 214 can be hydraulic actuators, electric actuators, pneumatic actuators, or any of a wide variety of other actuators. Similarly, one or more flap actuators 216 are used to drive the position of flap 109 relative to spout 108. The flap actuators 216 can also be hydraulic actuators, electric actuators, pneumatic actuators, or any of a wide variety of other actuators.

Fill control system 156 can use automatic fill control system 180 to perform automated fill control to automatically execute a fill strategy in filling one of the receiving vehicles 102, 122. Therefore, fill strategy selector 182 can detect a user input selecting a fill strategy, or another input selecting a fill strategy, and access data store 152 for a stored fill algorithm that can be executed to perform the selected fill strategy. For instance, where the selected fill strategy is a back-to-front strategy, the algorithm will direct filling of the receiving vehicle beginning at the back of the receiving vehicle and moving to the front of the receiving vehicle. Other fill strategies can be selected as well. Fill strategy implementation processor 184 receives inputs from the automatic fill control sensors 164, spout position sensor 168 and flap position sensor 170 and generates an output to fill control signal generator 196 based upon the inputs from the sensors, to execute the desired automatic fill control strategy. Fill control signal generator 196 can generate control signals to control any of the controllable subsystems 262 (or other items) to execute the fill strategy being implemented by fill strategy implementation processor 184.

As discussed above, it may be that even though control signals are generated by automatic fill control system 180 in implementing an automatic fill strategy, those signals cannot command spout actuators 214 and/or flap actuators 216 to position spout 108 and flap 109 to deliver harvested material to the desired landing position. Assume, for instance, that fill strategy implementation processor 184 is beginning a back-to-front fill strategy. However, assume that receiving vehicle 104 is positioned too far back (relative to harvester 100) so that, even at its extreme reward position, spout actuator 214 cannot position spout 108 to deliver harvested material to the very rear of receiving vehicle 104. In order to deliver harvested material to that landing point, the receiving vehicle must adjust its position relative to harvester 100 in the forward direction. That is, the receiving vehicle 104 must move forward relative to harvester 100. When the spout actuators 214 and flap actuators 216 cannot be controlled to deliver material to the receiving vehicle without an adjustment to the position of the receiving vehicle relative to the harvester, then fill strategy implementation processor 184 generates a signal indicative of this and provides it to remote application interaction system 158. Remote application interaction system 158, in turn, generates an output to mobile device 115 so that mobile device 115 can surface the requested adjustment in relative position to the operator of the receiving vehicle.

Manual fill control system 188 can use manual position adjustment detector 190 to detect a manual input from operator 220 (e.g., through interactive display mechanism 126) to identify a landing point in the receiving vehicle 102, 122 where the operator 199 desires the filling operation to be performed. Manual fill control system 188 can then generate outputs to fill control signal generator 196 which generates control signals to control the controllable subsystems 162 so that filling commences at the manually identified landing point in the receiving vehicle 102, 122.

Machine synchronization fill control system 194 can receive operator inputs or other inputs, as well as sensor inputs from sensors 154 to generate outputs to fill control signal generator 196 in order to synchronize the positions of agricultural harvester 100 and receiving vehicle 102, 122 so that a desired filling operation is performed. For instance, machine synchronization control system 194 can receive sensor inputs identifying that the current position that is being filled in receiving vehicle 102, 122, is at a desired fill level so that the receiving vehicle should move forward or rearward relative to agricultural harvester 100. Machine synchronization fill control system 194 then generates an output to fill control signal generator 196 indicating this. Fill control signal generator 196 can generate an output either to controllable subsystems 162, or communication system 150, or both, based on the inputs from machine synchronization fill control system 194. For instance, where the output from system 194 indicates that the receiving vehicle 102, 122 should move forward relative to agricultural harvester 100, then fill control signal generator 196 can control communication system 150 to communicate with a corresponding machine synchronization fill control system 194 on towing vehicle 104 indicating that towing vehicle 104 should "nudge" forward relative to the harvester 100 by momentarily increasing its ground speed and then returning to its current ground speed. However, it may be that receiving vehicle 102, 122 or towing vehicle 104 do not have a machine synchronization fill control system. In that case, the "nudge" outputs generated by system 194 can be output to remote application interaction system 158 which can, itself, communicate with mobile device 115 to alert the operator of towing vehicle 104 that vehicle 104 needs to change its position relative to harvester 100.

Remote application interaction system 158 can receive inputs through interactive display mechanism 126 or other operator interface mechanisms 208 from operator 199 indicative of a command that will be sent to the operator of the towing vehicle 104 to change the position of the receiving vehicle relative to harvester 100. For instance, it may be that the operator 199 wishes for the receiving vehicle 102, 122 to move forward relative to harvester 100 or to move rearward relative to harvester 100 so that filling can continue at a different location within the receiving vehicle 102, 122. It may also be that operator 199 wishes the receiving vehicle to move outward relative to the harvester 100 (e.g., further away from the harvester 100) or to move inward relative to harvester 100 (e.g., closer to harvester 100). Similarly, it may be that operator 199 is about to stop harvester 100 and operator 199 provides an input indicative of that. In these cases, manual position adjustment detector 190 detects these inputs from operator 199. Where the manual input is an input that is to adjust the position of spout 108 relative to harvester 100, then fill control signal generator 196 generates an output to control spout actuators 214 and/or flap actuators 216 to move the spout 108 and/or flap 109 to the desired positions. However, where the manual input is an input to communicate to mobile device 115 that operator 199 wishes to change the position of receiving vehicle 102, 122 relative to harvester 100, then the manual position adjustment detector 190 detects that manual input and provides an output to remote application interaction system 158. Remote application interaction system 158 can receive an indication of the operator input, and generate an output that is communicated to a remote application on mobile device 115.

Examples of mobile device 115 are described below. Suffice it to say, for now, that the application on mobile device 115 can receive the output from remote application interaction system 158 and generate a display or a different output on an operator interface mechanism on mobile device 115 to communicate to the operator of towing vehicle 104 (or a semi-tractor towing trailer 122) that operator 199 of harvester 100 wishes to adjust the relative position between harvester 100 and receiving vehicle 102, 122. In one example, the mobile device 115 also generates an output showing the operator of towing vehicle 104 (or the operator of a semi-tractor towing trailer 122) the direction and/or magnitude of the adjustment to the relative position.

Similarly, remote application interaction system 158 can receive a "nudge" output from machine synchronization fill control system 194 indicating that system 194 wishes to "nudge" the receiving vehicle 102, 122 to change the position of receiving vehicle 102, 122 relative to harvester 100. Again, as when an operator input is received from operator 199, remote application interaction system 158 generates an output that is communicated to mobile device 115 so that the operator of towing vehicle 104 (or a semi-tractor pulling trailer 122) can identify the adjustment in relative position, the direction of the adjustment and/or the magnitude of the adjustment desired by operator 199 or machine synchronization fill control system 194.

Therefore, connection controller 200 establishes a connection with the mobile device 115. This can be done in a number of different ways. Some of the different ways are described below with respect to FIG. 9. Communication controller 202 generates control signals to control communication system 150 to communicate with mobile device 115 based on the outputs from other items in remote application interaction system 150. Fill control interaction system 204 interacts with fill control system 156 to receive the manual inputs (from operator 199) through the manual position adjustment detector 190 in manual fill control system 188.

Based on the outputs received at fill control interaction system 204 from automatic fill control system 180, manual fill control system 188 and/or machine synchronization fill control system 194, an output is provided from system 204 to remote application output generator 205. Generator 205 generates an output to an application on mobile device 115 indicating the relative position adjustment that is either manually input by operator 199 or automatically generated by automatic fill control system 180 or machine synchronization fill control system 194. As discussed elsewhere, the output to the application on mobile device 115 can be an output indicating that a change in relative position between the two vehicles is desired, the direction of the change, and/or the magnitude of the change. In addition, the change may be a change in motion. For example, the output to the mobile device 115 may be indicating that harvester 100 is about to stop. Communication controller 202 then controls communication system 150 to send the output generated by remote application output generator 205 to the remote application on mobile device 115. That remote application can then surface the information to the operator of the towing vehicle so that the operator of the towing vehicle can make the desired adjustment in the position of the receiving vehicle 104, 122 relative to harvester 100.

Figure 6:
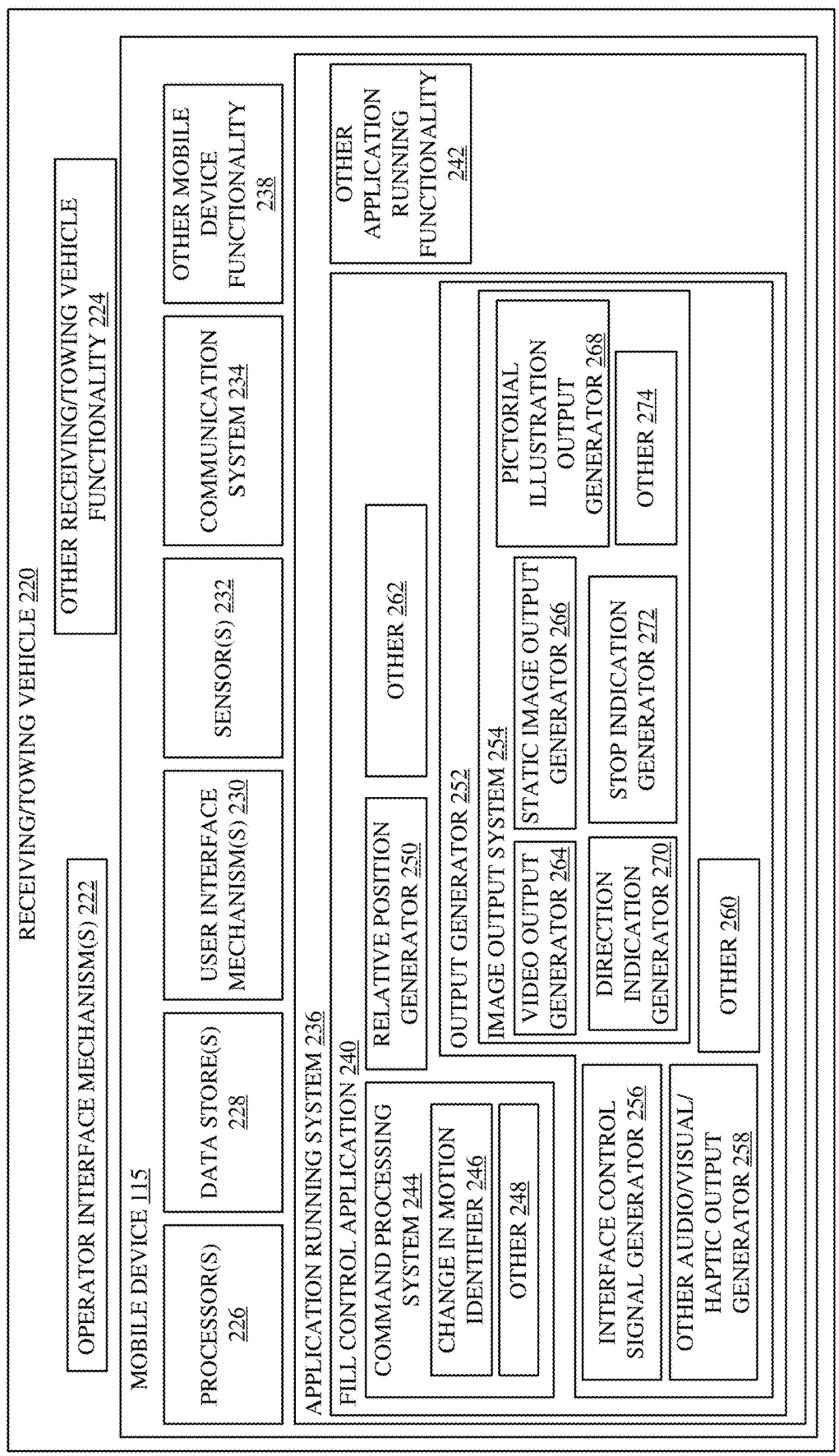
FIG. 6 is a block diagram of one example of a receiving/towing vehicle.

FIG. 6 is a block diagram of one example of a receiving/towing vehicle 220. It will be appreciated that receiving/towing vehicle 220 can be tractor 104, the semi-tractor pulling trailer 122, or another vehicle that can be operated by an operator local to that vehicle. Receiving/towing vehicle 220 illustratively includes one or more operator interface mechanisms 222, mobile device 115 (which may be carried by an operator of vehicle 220, mounted within an operator compartment of vehicle 220, etc.), and other receiving/towing vehicle functionality 224. In the example shown in FIG. 6, mobile device 115 illustratively includes one or more processors 226, data store or other memory 228, user interface mechanisms 230, one or more sensors 232, communication system 234, application running system 236, and other mobile device functionality 238. Application running system 236 can run a fill control application 240 and it can include other application running functionality 242.

Application 240 can be downloaded by mobile device 115, or it can be installed on mobile device 115 in other ways. In the example shown in FIG. 6, fill control application 240 illustratively includes command processing system 244 (which, itself, includes change in motion identifier 246 and other items 248), relative position generator 250, output generator 252, and other items 262. Output generator 252 can include image output system 254, interface control signal generator 256, other audio/visual/haptic output generator 258, and other items 260. Image output system 254 can include video output generator 264, static image output generator 266, pictorial illustration output generator 268, direction indication generator 270, stop indication generator 272, and other items 274. Before describing the overall operation of receiving/towing vehicle 220 in more detail, a brief description of some of the items shown in FIG. 6 will first be provided.

Operator interface mechanisms 222 can include a steering wheel, pedals, joysticks, other visual, audio, haptic, or other interface mechanisms. User interface mechanisms 230 can illustratively include a display screen, a keypad, buttons, icons, a touch sensitive display screen, audio output mechanisms, a haptic output mechanism, or other interface mechanisms. Sensors 232 on mobile device 115 can include position sensors (such as a GPS receiver), accelerometers, inertial measurement units, or other sensors. Communication system 234 can include a cellular communication system, a near field communication system, a Bluetooth communication system, WIFI, local or wide area network communication systems, or other communication systems or combinations of systems.

Command processing system 244 receives an adjustment command from agricultural harvester 100 indicating a desired adjustment in the position of receiving/towing vehicle 220 relative to harvester 100. Change in motion identifier 246 illustratively identifies a desired change in motion of receiving/towing vehicle 220 indicated by the received adjustment command. For instance, the change in motion may be to temporarily increase in speed in order to move receiving/towing vehicle 220 forward relative to harvester 100. The change in motion may be to temporarily reduce speed so that receiving/towing vehicle 220 moves rearward relative to harvester 100. The change in motion may be to move away from (e.g., outward relative) to harvester 100, or to move closer (e.g., inward relative to), harvester 100. The change in motion may also be to stop.

In one example, relative position generator 250 determines the relative position of receiving/towing vehicle 220 (based upon the position of mobile device 115) and harvester 100. In such an example, relative position controller 250 can use RADAR or other sensors to detect the position of harvester 100 relative to receiving/towing vehicle 220. In another example, relative position generator 250 can receive the position output by a GPS sensor 232 as well as position information indicating the position of harvester 100 (which may be received with the adjustment command). Based upon the two position signals, relative position generator 250 can generate an output indicative of the position of vehicle 220 relative to harvester 100. Based upon the commanded adjustment to the motion of vehicle 220 (e.g., to stop or to adjust the relative position of the two vehicles 100 and 220) identified by command processing system 244, and possibly based upon the relative position output by relative position generator 250, output generator 252 generates an output on user interface mechanisms 230 to indicate to the operator of receiving/towing vehicle 220 the contents of the requested adjustment. The output may indicate the direction of the requested adjustment, the magnitude of the requested adjustment, or other information. In addition, the output may be to display the streaming video information or static image information captured by camera 106 or another camera on agricultural harvester 100. Thus, image output system 154 can generate an image that may be displayed on a display screen in user interface mechanisms 230.

Video output generator 264 may receive the streaming video from camera 106, along with the adjustment command and generate an output that shows the streaming video with an adjustment indicator overlaid on or superimposed on or otherwise integrated into the streaming video. Static image output generator 266 can generate a static image captured by an image detector or camera on harvester 100 and provide an output so the static image is displayed along with the adjustment indicator that may be superimposed or otherwise incorporated into the static image. Pictorial illustration output generator 268 generates a pictorial illustration such as a pictorial illustration of harvester 100 and towing/receiving vehicle 220. Direction indication generator 270 generates a direction indicator that indicates the direction of the commanded adjustment in relative position between harvester 100 and vehicle 220. The direction indicator may be overlaid on or otherwise incorporated into the display of the streaming video output by video output generator 264. The direction indicator may be overlaid or otherwise incorporated into the static image output by static image output generator 266, or the direction indicator may be overlaid or otherwise incorporated into the pictorial illustration output generator 268. Again, the direction indicator can be an arrow, it can be a sequence of display elements that blink or visually advance in the direction of the desired adjustment, or it can be a wide variety of other visual direction indicators.

Stop indication generator 272 illustratively generates a stop indicator that may be output by itself, or superimposed on or otherwise incorporated into the streaming video output by video output generator 264. The stop indicator may also be overlaid on or otherwise incorporated into the static image output by static image output generator 268, or the stop indicator may be overlaid on or otherwise incorporated into the pictorial illustration output by pictorial illustration output generator 268. The stop indicator may be a visual stop sign, or another indicator that indicates that operator 199 wishes that receiving/towing vehicle 220 come to a stop.

Other audio/visual/haptic output generator 258 can generate other audio outputs, visual outputs and/or haptic outputs to indicate to the operator of receiving/towing vehicle 220 the content of the commanded adjustment to the motion of receiving/towing vehicle 220, such as to stop or to adjust the relative position between vehicle 220 and harvester 100.

Interface control signal generator 256 illustratively receives inputs from image output system 254 and/or generator 258 and generates control signals to control user interface mechanisms 230 accordingly. For instance, signal generator 256 can generate control signals to control the display screen of mobile device 115 to show the output indicators generated by image output system 254 and/or output generator 258. Signal generator 256 can control speakers or other audio output mechanisms, haptic output mechanisms, or other user interface mechanisms 230 as well.

FIGS. 7A-8E show examples of user interface displays that can be generated on a display user interface mechanism on mobile device 115. Some items are similar in FIGS. 7A-8E and they are similarly numbered. Also, while the discussion of FIGS. 7A-8E is with respect to the adjustment command coming from operator 199, the adjustment command could just as easily have come from other items on harvester 100. FIG. 7A shows a top-down pictorial illustration of a harvester 300, towing vehicle 302, and receiving vehicle 304 in the form of a towed trailer. Harvester 300 and receiving vehicle 304 are in a side-by-side configuration. Harvester 300 is illustratively shown as moving in the direction indicated by arrow 301. FIG. 7A also shows an adjustment indicator 306. Adjustment indicator 306 is in the form of an arrow which indicates the direction of the desired adjustment to the relative position between harvester 300 and receiving vehicle 304, based upon the adjustment command received by command processing system 244 in mobile device 115. In the example shown in FIG. 7A, the arrow points upwardly on the user interface display indicating that the operator 199 of harvester 100 has provided an adjustment command indicating that operator 199 wishes for the position of receiving vehicle 304 to move forward relative to harvester 300.

FIG. 7B is similar to FIG. 7A except that an adjustment indicator 308 is an arrow pointing in the opposite direction of arrow 306. This indicates that operator 199 wishes to adjust the position of receiving vehicle 304 rearwardly relative to the position of harvester 300.

FIG. 7C is similar to FIGS. 7A and 7B except that a direction indicator 310 indicates that operator 199 is commanding a relative position adjustment so that receiving vehicle 304 moves outward (or away) relative to the position of harvester 300.

FIG. 7D is similar to FIG. 7C except that an adjustment indicator 312 shows that operator 199 has commanded an adjustment in the relative position of receiving vehicle 304 and harvester 100 so that receiving vehicle 304 comes closer to harvester 100.

FIG. 7E is similar to FIGS. 7A-7D, except that adjustment indicator 314 indicates that operator 199 has provided an adjustment command commanding that the receiving vehicle 304 stop.

FIGS. 8A-8E are similar to FIGS. 7A-7E and similar items are similarly numbered. FIGS. 8A-8E show harvester 300 filling receiving vehicle 304 in a following configuration. FIG. 8A shows that an adjustment indicator 316 indicates that operator 199 has provided an adjustment command indicating that operator 199 wishes the receiving vehicle 304 to move forward relative to the position of harvester 100. FIG. 8B is similar to FIG. 8A except that the adjustment indicator 318 shows that operator 199 wishes for receiving vehicle 304 to move rearward relative to the position of harvester 100. FIG. 8C is similar to FIG. 8B except that adjustment indicator 320 indicates that operator 199 wishes the receiving vehicle 304 to move to the right relative to the position of harvester 100 and FIG. 8D shows that operator 199 wishes for the receiving vehicle 304 to move to the left relative to the position of harvester 300. FIG. 8E shows that the adjustment indicator 324 indicates that operator 199 wishes for the receiving vehicle 304 to stop.

Figure 9:
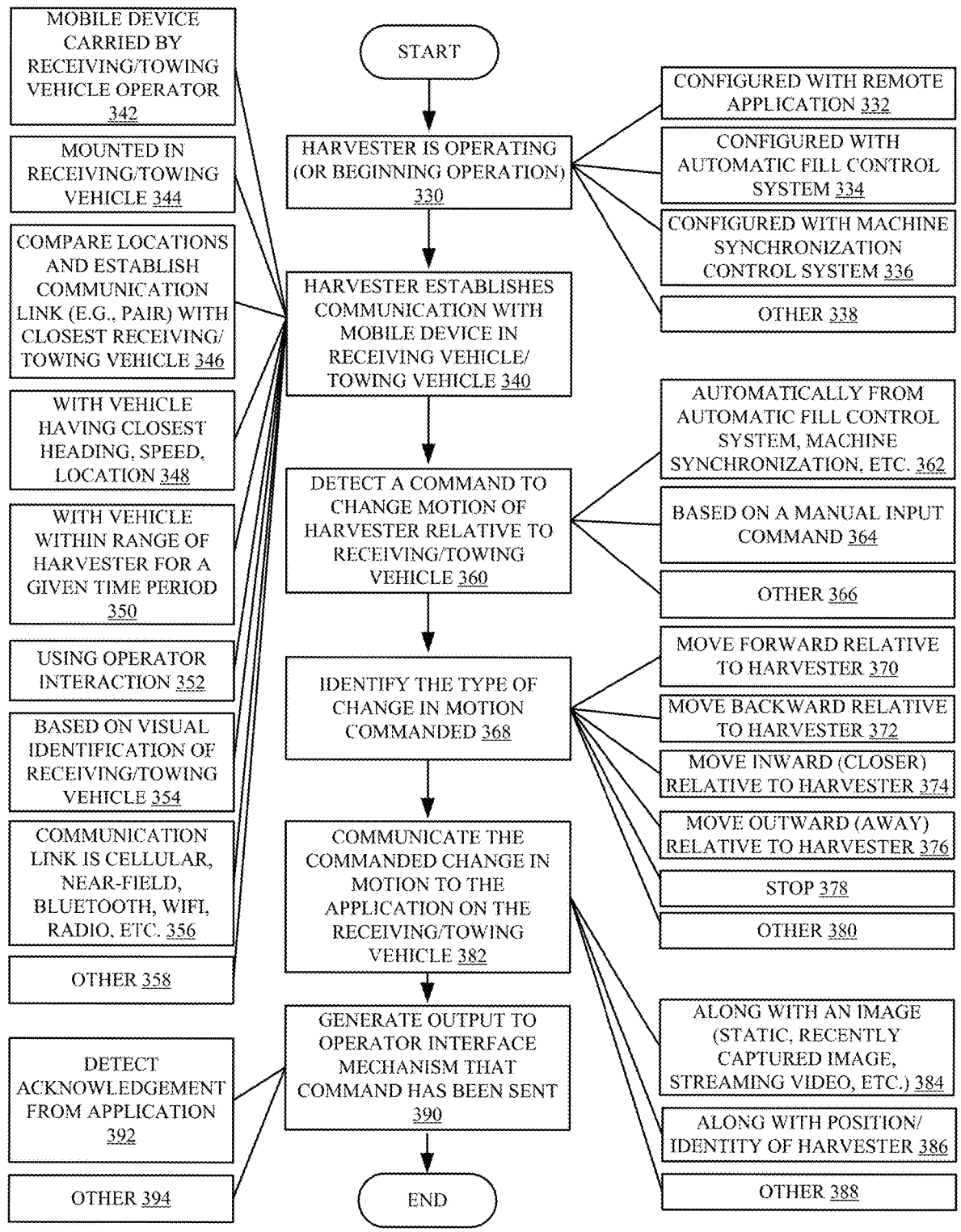
FIG. 9 shows a flow diagram illustrating one example of detecting that a receiving vehicle should be repositioned relative to a harvester and generating a reposition signal.

FIG. 9 is a flow diagram illustrating one example of the operation of harvester 100 in receiving an input indicative of a desired adjustment to the motion of vehicle 220, such as to stop or such as an adjustment to the relative position between harvester 100 and towing/receiving vehicle 220, and generating an output to the application 240 on mobile device 115. It is first assumed that harvester 100 is operating, or is about to begin operation, as indicated by block 330 in the flow diagram of FIG. 9. In one example, it is also assumed that harvester 100 has remote application interaction system 158 as indicated by block 332. Harvester 100 may be configured with fill control system 156, as indicated by block 334 and/or by machine synchronization fill control system 194, as indicated by block 336. Harvester 100 can be operating or configured in other ways as well, as indicated by block 338.

At some point, connection controller 200 in remote application interaction system 158 establishes a communication link with mobile device 115 on receiving/towing vehicle 220. Establishing the communication link is indicated by block 340. The mobile device 115 may be carried by the operator of receiving/towing vehicle 220, as indicated by block 342, or mounted in receiving/towing vehicle 220, as indicated by block 344.

Connection controller 200 can establish a communication link with the application 240 in mobile device 115 in a variety of different ways. For instance, connection controller 200 can detect the location of mobile device 115 and the location of harvester 100 and establish a communication link with mobile device 115 once it is within a given range of harvester 100. Similarly, there may be multiple receiving/towing vehicles 220 in the same field. Therefore, connection controller 200 can identify the closest mobile device 115 and establish a connection with the closest mobile device (and hence the closest receiving/towing vehicle 220). Comparing the locations to the various receiving/towing vehicles 220 and establishing a communication link (or pairing) with the closest is indicated by block 346 in the flow diagram of FIG. 9.

In another example, connection controller 200 can compare the location, heading, and speed of harvester 100 with the location heading, and speed of receiving/towing vehicle 220 (or mobile device 115) and establish a communication link with the receiving/towing vehicle 220 that has the closest location, heading, and speed to harvester 100. Establishing a communication link with the mobile device 115 on the receiving/towing vehicle 220 that has the closets location, heading, and speed to harvester 100 is indicated by block 348 in the flow diagram of FIG. 9.

Connection controller 202 can determine which vehicle (and hence which mobile device 115) is within a predetermined range of harvester 100 for a threshold time period. This may indicate that the receiving vehicle is following or in side-by-side relationship with harvester 100. Detecting which vehicle or mobile device is within a predetermined range of harvester 100 for a threshold time period is indicated by block 350.

Connection controller 200 can receive an operator input from operator 199 indicating which particular mobile device to establish a connection with. For instance, all of the different mobile devices that are within Bluetooth or other near field communication range of harvester 100 may be displayed to operator 199 on an interactive display screen. Operator 199 can then select one of the mobile devices with which to establish a communication link, and connection controller 200 can then establish a connection with the selected mobile device. Establishing a communication link with a mobile device based upon an operator interaction is indicated by block 352 in the flow diagram of FIG. 9.

In one example, image processing can be used in establishing communication. Image processing can be performed on the image captured by camera 106 to identify the particular receiving/towing vehicle 220 that is receiving harvested material from harvester 100. The identity of the receiving/towing vehicle 220 may be correlated to a particular mobile device 115, and, once the identity of vehicle 220 is known, connection controller 202 can establish a connection with that particular mobile device 115. Establishing the communication link based upon visual identification of the receiving/towing vehicle 220 is indicated by block 354 in the flow diagram of FIG. 9.

Again, it will be noted that the communication link can be a cellular link, a near field communication link, a Bluetooth link, a WIFI link, a radio link, or another type of communication link, as indicated by block 356. The communication link can be established in other ways as well, as indicated by block 358.

Fill control interaction system 204 then detects a command to change motion of the harvester 100 relative to the receiving/towing vehicle 220, as indicated by block 360 in the flow diagram of FIG. 9. The detected adjustment command can be generated automatically from automatic fill control system 180 or machine synchronization fill control system 194, etc. Detecting an automatically generated adjustment command is indicated by block 362 in the flow diagram of FIG. 9. The adjustment command can be detected based upon a manual input from operator 199 through manual position adjustment detector 190. Detecting an adjustment input based upon a manual input command is indicated by block 364 in the flow diagram of FIG. 9. The adjustment command can be detected in other ways as well, as indicated by block 366.

The adjustment command can be processed to identify the type of adjustment that has been commanded, as indicated by block 368 in the flow diagram of FIG. 9. For instance, the adjustment command may be to move forward relative to harvester 100 as indicated by block 370, to move backward relative to harvester 100 as indicated by block 372, to move inward (or closer) relative to harvester 100 as indicated by block 374, to move outward (or away) relative to harvester 100 as indicated by block 376, to stop, as indicated by block 378, or to make another type of adjustment relative to harvester 100 such as move to the right, move to the left, etc.), as indicated by block 380.

Remote application output generator 205 generates an output indicative of the type of commanded adjustment and communication controller 202 controls communication system 150 to communicate that output to command processing system 244 in fill control application 240 on mobile device 115. Communicating the commanded change in motion to the application on the receiving/towing vehicle 220 is indicated by block 382 in the flow diagram of FIG. 9.

It will be noted that the adjustment command can be communicated to the application 240 along with an image (such as a static image, a recently captured image, streaming video, etc.) captured by camera 106 or other image capture device on harvester 100. Sending the adjustment command along with an image is indicated by block 384 in the flow diagram of FIG. 9. In addition, the adjustment command can be sent along with a position or an identity of harvester 100. Sending a position or identity of harvester 100 can be sent along with the adjustment command, as indicated by block 386. The commanded change in motion can be communicated to the application 240 in other ways and include other information as well, as indicated by block 388.

In one example, communication controller 202 can also generate an output on operator interface mechanisms 160 for operator 199, confirming that the commanded adjustment has been communicated to the mobile device 115 on receiving/towing vehicle 220, as indicated by block 390 in the flow diagram of FIG. 9. The communication controller 202 can also detect an acknowledgement from mobile device 115, as indicated by block 392. Communication controller 202 can generate other outputs as well, as indicated by block 394.

Figure 10:
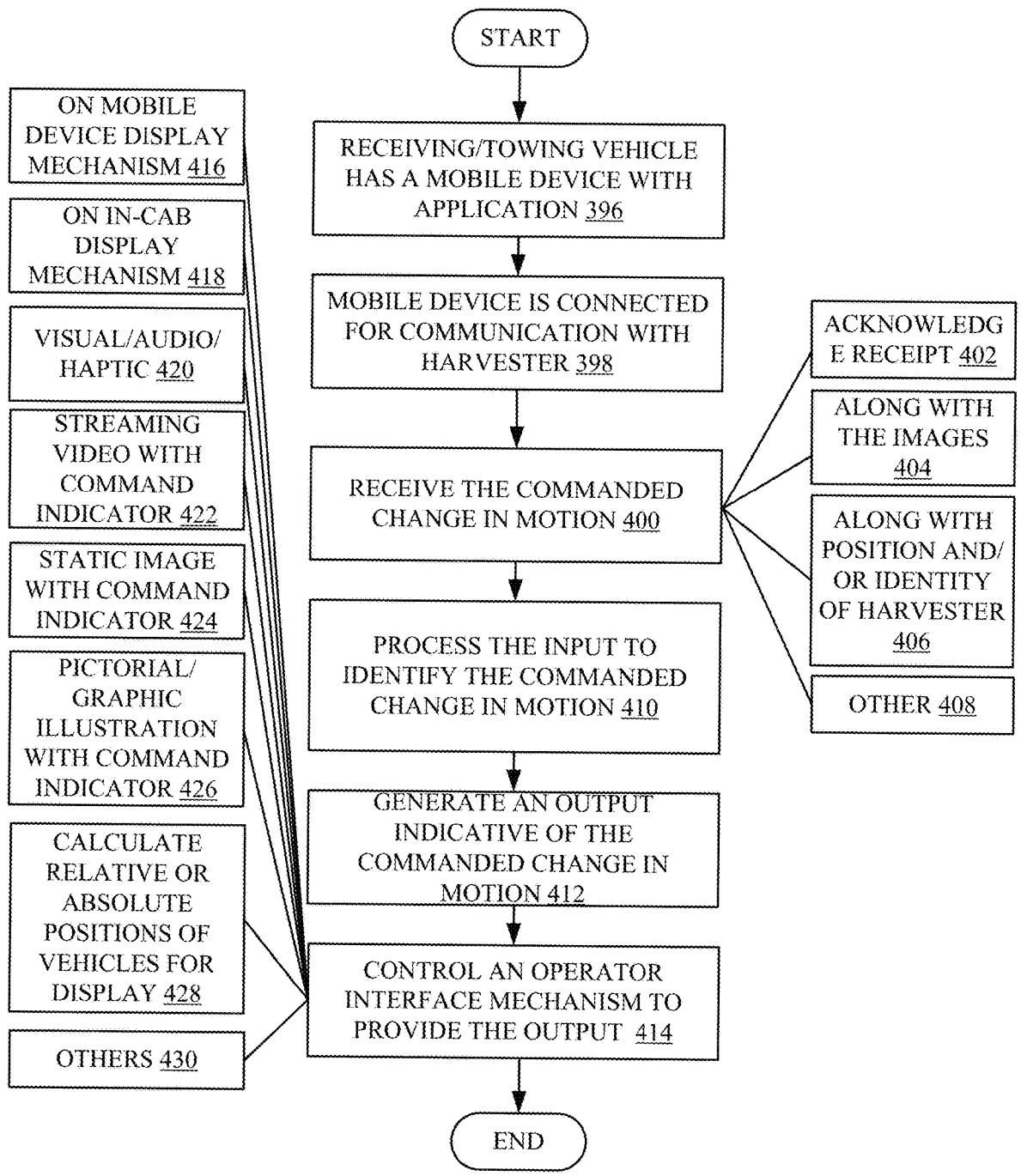
FIG. 10 is a flow diagram showing one example of the operation of a mobile device.

FIG. 10 is a flow diagram illustrating one example of the operation of mobile device 115 in receiving an adjustment command and generating an output for the operator of receiving/towing vehicle 220, indicative of the adjustment command. It is first assumed that the receiving/towing vehicle 220 has a mobile device 115 with the fill control application 240, as indicated by block 396 in the flow diagram of FIG. 10. It is also assumed that the mobile device 115 is connected over a communication link with harvester 100, as indicated by block 398.

At some point, command processing system 244 receives an adjustment command or a commanded change in motion, as indicated by block 400. Command processing system 244 can generate an acknowledgement back to harvester 100, as indicated by block 402. In one example, the adjustment command or commanded change in motion is received along with an image, as discussed above, as indicated by block 404 in the flow diagram of FIG. 10. Also, the command processing system 244 may identify that the adjustment command is received along with the position and/or identity of harvester 100, as indicated by block 406. The commanded change in motion or adjustment command can be received in other ways or with other information as well, as indicated by block 408.

Command processing system 244 then processes the command to identify the commanded change in motion. Processing the command is indicated by block 410. Again, the commanded adjustment may be to move forward or backward relative to harvester 100, to move closer to or further away from harvester 100, right or left, or to stop.

Output generator 252 then generates an output indicative of the commanded change in motion, as indicated by block 412, and interface control signal generator 256 generates control signals to control an operator interface mechanism 230 to provide the output to the operator of receiving/towing vehicle 220. Controlling the user interface mechanism 230 to provide the output is indicated by block 414 in the flow diagram of FIG. 10.

In one example, the interface control signal generator 256 generates control signals to control the user interface mechanisms 230 on mobile device 115, as indicated by block 416 in the flow diagram of FIG. 10. In another example, interface control signal generator 256 communicates with another display or operator interface mechanism in the operator compartment of receiving/towing vehicle 220, that is separate from mobile device 115, and controls that user interface mechanism to provide the output, as indicated by block 418 in the flow diagram of FIG. 10. The output can be a visual/audio/haptic output as indicated by block 420. The output can be a streaming video output with a command indicator overlaid or otherwise incorporated into the streaming video, as indicated by block 422. The output can be a static image display with the command indicator overlaid or otherwise incorporated into the static image, as indicated by block 424. The output can be a pictorial or graphic illustration with the command indicator overlaid or otherwise incorporated into the pictorial or graphic illustration, as indicated by block 426.

The output can be displayed based upon the relative position of harvester 100 and receiving/towing vehicle 220 as well. For instance, the distance between the receiving/towing vehicle 220 and harvester 100 displayed on a display device may be greater or lesser based upon the actual position of the two vehicles relative to one another. Generating the output on a user interface mechanism based on a calculation of the absolute or relative positions of the vehicles is indicated by block 428 in the flow diagram of FIG. 10. An operator interface mechanism can be controlled to provide the output in other ways as well, as indicated by block 430.

It will be appreciated that the receiving/towing vehicle 220 may have greater freedom to change its position relative to harvester 100 than harvester 100 has to change its position relative to vehicle 220. For example, because harvester 100 is power starved, or due to the harvesting conditions a change in the speed of harvester 100 may not be advisable. Thus, the present description describes a system that displays or otherwise brings to the attention of the operator of towing/receiving vehicle 220 an indicator indicating that a change in motion (e.g., stop or change in relative position) is desired. The change in relative position can be commanded automatically by an automatic fill control system or a machine synchronization control system, or it can be based on a manual input from the operator 199 of harvester 100. The commanded adjustment can be received by a mobile application running on a mobile device 115 in the receiving/towing vehicle 220 and can thus be surfaced for the operator of the receiving/towing vehicle 220 in a wide variety of different ways.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 11:
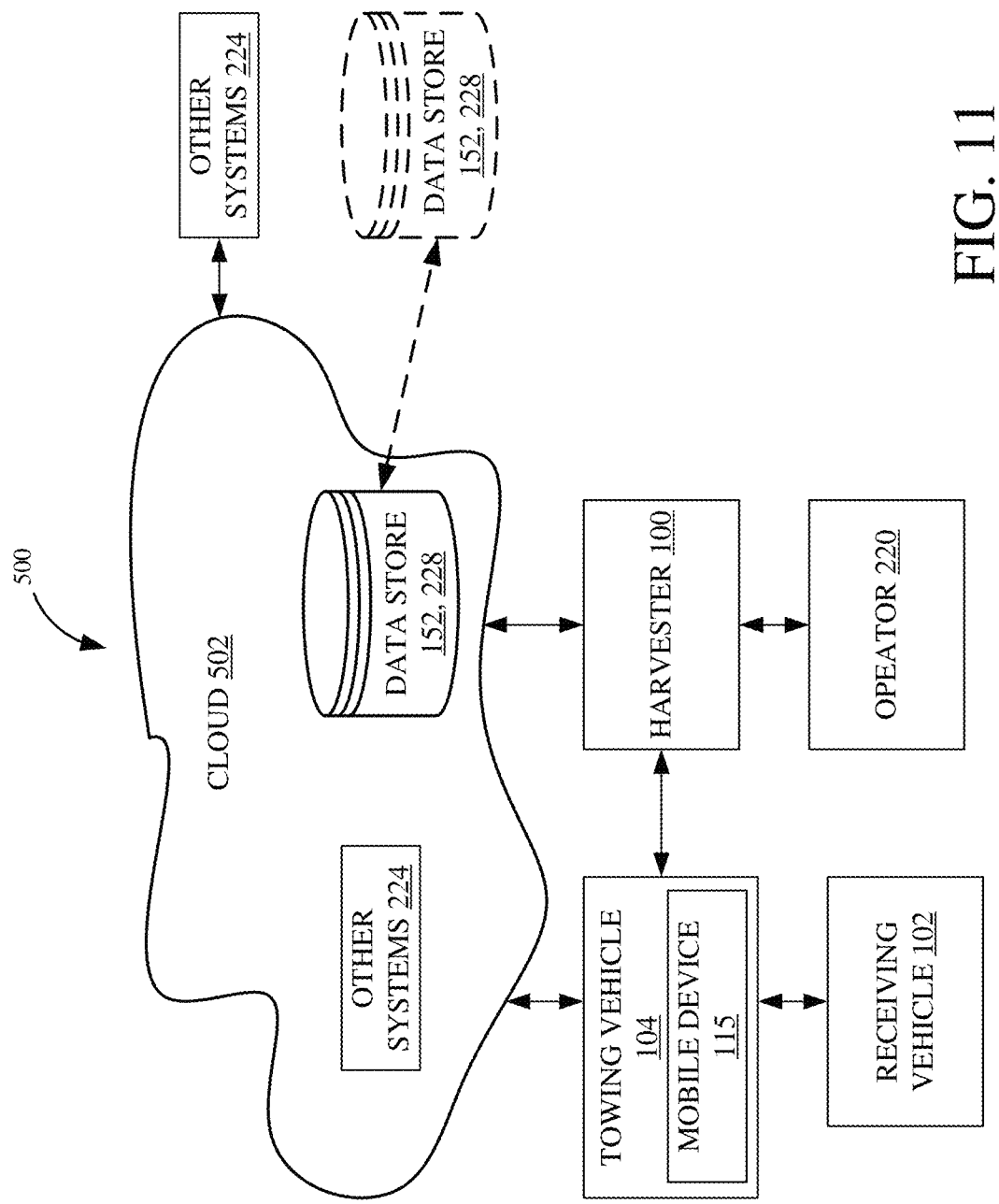
FIG. 11 shows a block diagram of a harvester in a remote server architecture.

FIG. 11 is a block diagram of harvester 100, 300 shown in FIGS. 1-10, as well as receiving/towing vehicle 104, 220 except that they communicate with elements in a remote server architecture 500. In an example, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIGS. 1-10 as well as the corresponding data, can be stored on servers at a remote location. The computing resources in a remote server environment can be consolidated at a remote data center location or they can be dispersed. Remote server infrastructures can deliver services through shared data centers, even though the servers appear as a single point of access for the user. Thus, the components and functions described herein can be provided from a remote server at a remote location using a remote server architecture. Alternatively, the components and functions can be provided from a conventional server, or they can be installed on client devices directly, or in other ways.

In the example shown in FIG. 11, some items are similar to those shown in FIGS. 1-10 and they are similarly numbered. FIG. 11 specifically shows that data stores 152, 228, other systems 224, and other parts of the harvester 100, 300 and/or mobile device 115 shown in FIGS. 1-10 can be located at a remote server location 502. Therefore, harvester 100, 300 and mobile device 115 can access those systems through remote server location 502.

FIG. 11 also depicts another example of a remote server architecture. FIG. 11 shows that it is also contemplated that some elements of FIGS. 1-10 are disposed at remote server location 502 while others are not. By way of example, data stores 152, 228 or portions of them, or other systems 224 can be disposed at a location separate from location 502, and accessed through the remote server at location 502. Regardless of where the items are located, the items can be accessed directly by harvester 100, 300 and/or mobile device 115 through a network (such as a wide area network or a local area network), the items can be hosted at a remote site by a service, or they can be provided as a service, or accessed by a connection service that resides in a remote location. Also, data stored by harvester 100, 300 and/or mobile device 115 can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the harvester 100, 300 and/or mobile device 115 comes close to the fuel truck for fueling, the system automatically collects the information from the harvester 100, 300 and/or mobile device 115 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester 100, 300 and/or mobile device 115 until the harvester 100, 300 and/or mobile device 115 enters a covered location. The harvester 100, 300 and/or mobile device 115, itself, can then send the information to the main network.

It will also be noted that the elements of FIGS. 1-10 or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 12:
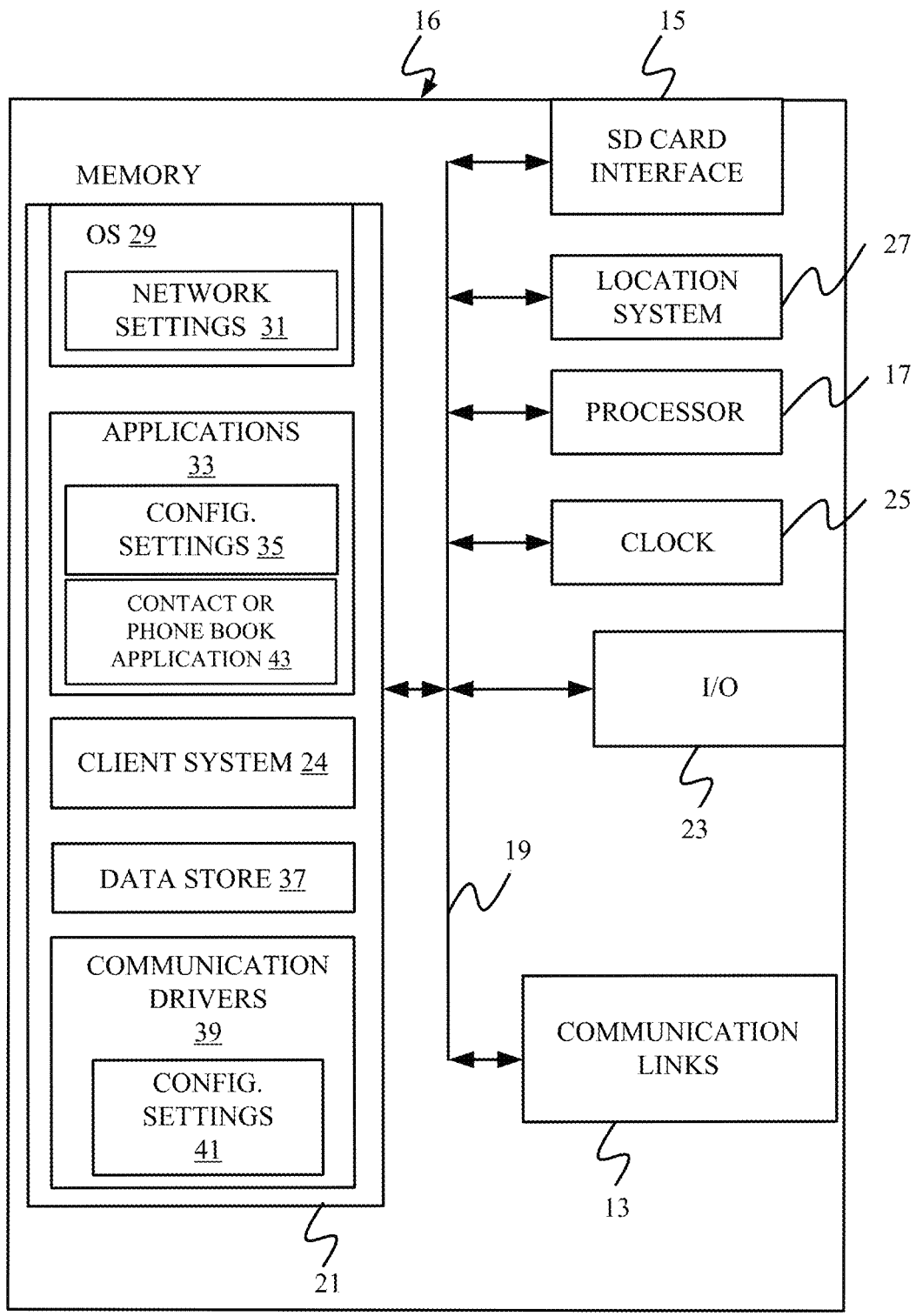
FIGS. 12-14 show examples of mobile devices that can be used in harvesters.
Figure 13:
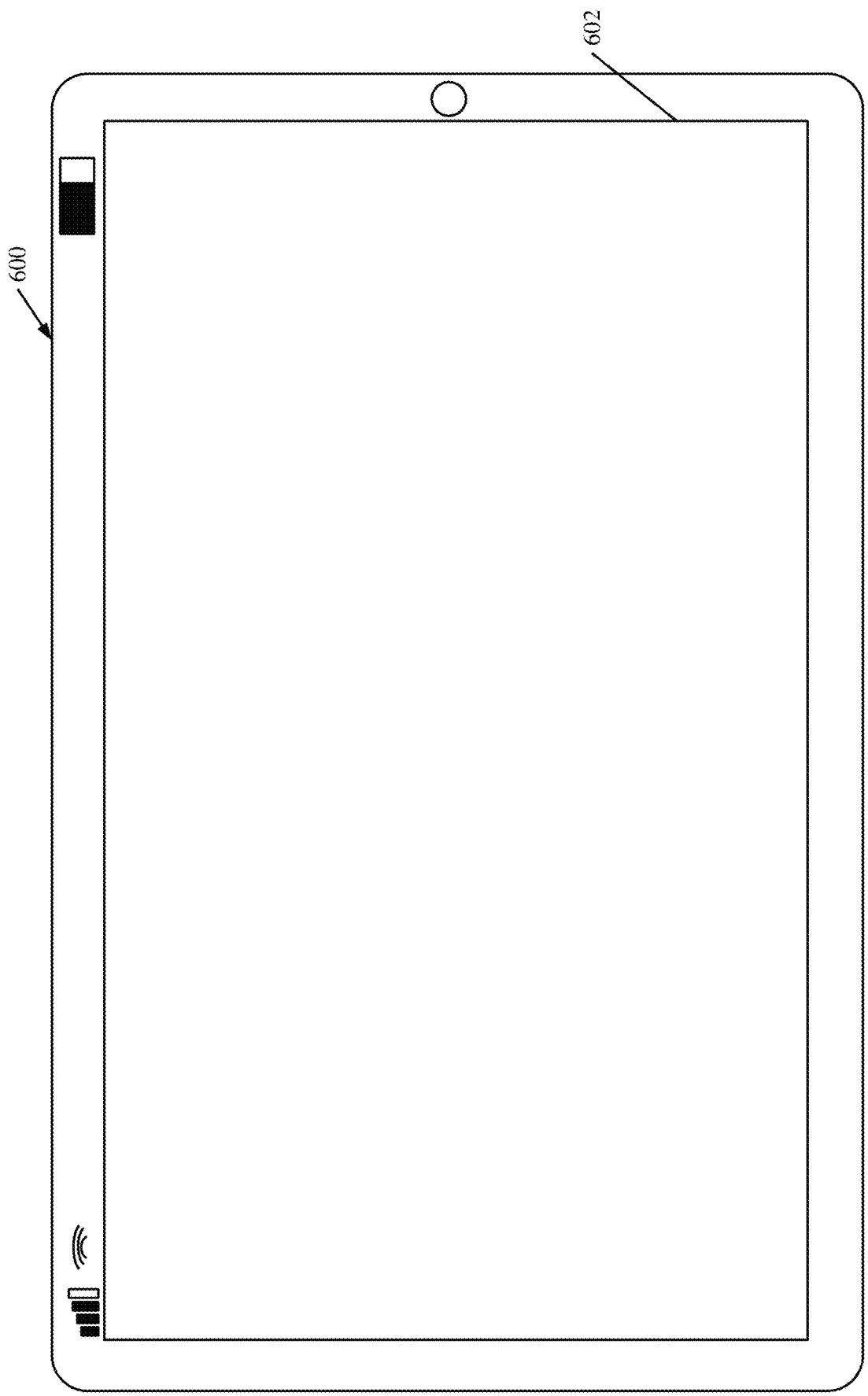
Figure 14:
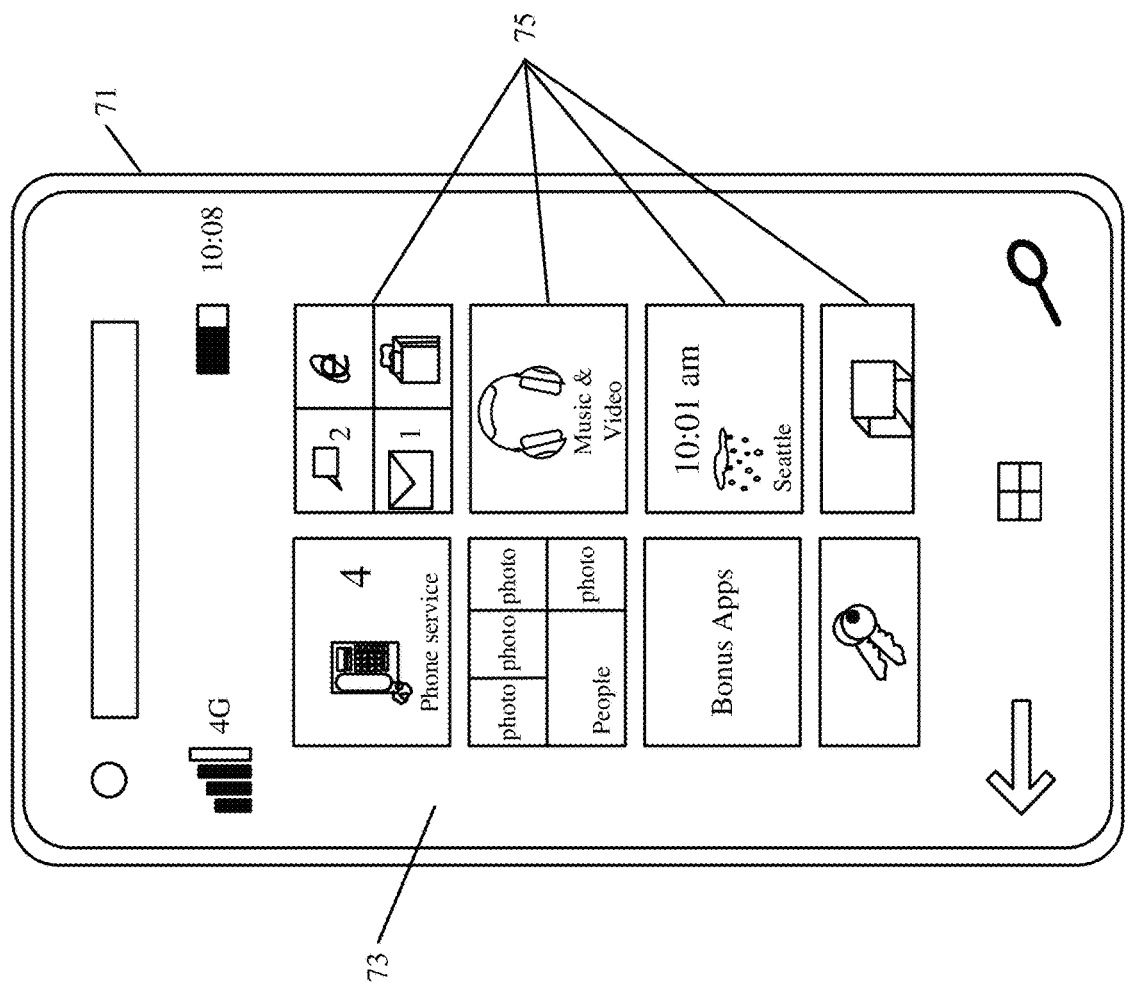

FIG. 12 is a simplified block diagram of one illustrative example of a handheld or mobile computing device that can be used as mobile device 115 and as a user's or client's hand held device 16, in which the present system (or parts of it) can be deployed. For instance, a mobile device can be deployed in the operator compartment of harvester 100, 300 and/or receiving/towing vehicle 104, 220 for use in generating, processing, or displaying the spout and flap data and the commanded adjustment indicator and other information. FIGS. 13-14 are examples of handheld or mobile devices.

FIG. 12 provides a general block diagram of the components of a client device 16 that can run some components shown in FIGS. 5 and 6, that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications (such as fill control application 240) can be received on a removable Secure Digital (SD) card that is connected to an interface 15. Interface 15 and communication links 13 communicate with a processor 17 (which can also embody processors/servers from previous FIGS.) along a bus 19 that is also connected to memory 21 and input/output (I/O) components 23, as well as clock 25 and location system 27.

I/O components 23 (which can comprise user interface mechanisms 230), in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other VO components 23 can be used as well.

Clock 25 illustratively comprises a real time clock component that outputs a time and date. It can also, illustratively, provide timing functions for processor 17.

Location system 27 (which can be one of sensors 232) illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 (which can include data store 228 and other memory) stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions (such as fill control application 240) that, when executed by processor 17, cause the processor to perform computer-implemented steps or functions according to the instructions. Processor 17 can be activated by other components to facilitate their functionality as well.

FIG. 13 shows one example in which device 16 is a tablet computer 600. In FIG. 13, computer 600 is shown with user interface display screen 602 (which can be one of user interface mechanisms 230). Screen 602 can be a touch screen or a pen-enabled interface that receives inputs from a pen or stylus. computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 14 shows that the device can be a smart phone 71. Smart phone 71 has a touch sensitive display 73 (which can be one of user interface mechanisms 230) that displays icons or tiles or other user input mechanisms 75. Mechanisms 75 can be used by a user to run applications (such as fill control application 240), make calls, perform data transfer operations, etc. In general, smart phone 71 is built on a mobile operating system and offers more advanced computing capability and connectivity than a feature phone.

Note that other forms of the devices 16 are possible.

Figure 15:
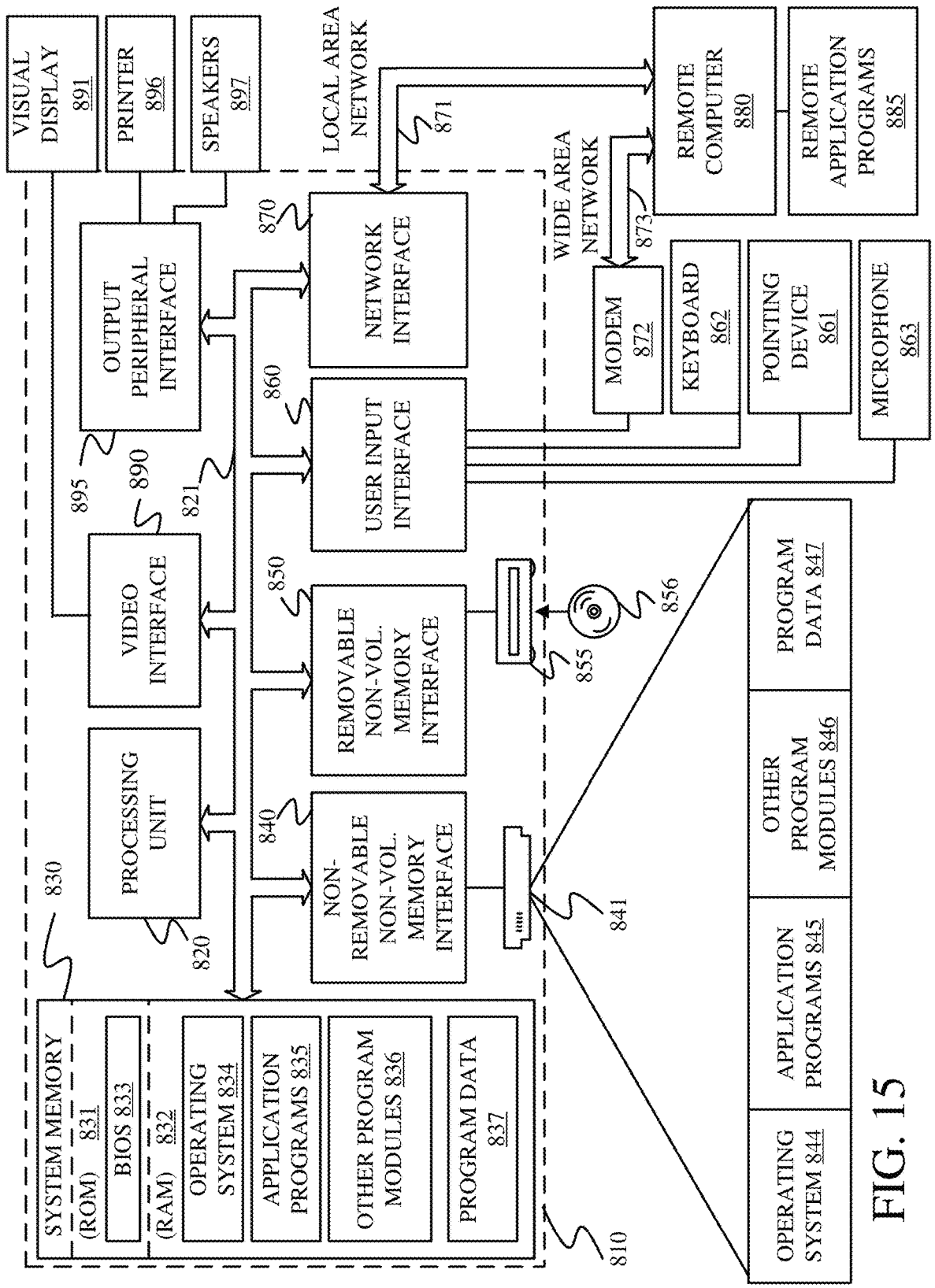
FIG. 15 is a block diagram of a computing environment that can be used in the machines, systems, and architectures shown and discussed with respect to the previous figures.

FIG. 15 is one example of a computing environment in which elements of previous FIGS., or parts of it, (for example) can be deployed. With reference to FIG. 15, an example system for implementing some embodiments includes a computing device in the form of a computer 810 programmed to operate as discussed above. Components of computer 810 may include, but are not limited to, a processing unit 820 (which can comprise processor or servers from pervious FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 15.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 15 illustrates operating system 834, application programs 835, other program modules 836, and program data 837.

The computer 810 may also include other removable/non-removable volatile/nonvolatile computer storage media. By way of example only, FIG. 15 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 15, provide storage of computer readable instructions, data structures, program modules and other data for the computer 810. In FIG. 15, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 15 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a material loading system, comprising:
a fill control application configured to run on a mobile device, the mobile device including a mobile device communication system configured to communicate with a material loading vehicle communication system on a material loading vehicle, the application including:
a command processing system that receives a motion adjustment command from the harvester, the command processing system being configured to identify a requested motion adjustment to motion of a receiving vehicle, that receives material from the material loading vehicle, based on the motion adjustment command; and
an output generator configured to generate a representation of an adjustment indicator indicative of the requested motion adjustment to the motion of the receiving vehicle;
an interface control signal generator configured to generate interface control signals based on the representation of the adjustment indicator; and
a user interface mechanism coupled to the output generator and configured to generate an operator perceptible output based on the interface control signals.

Example 2 is the material loading system of any or all previous examples wherein the motion adjustment command comprises a stop command requesting the receiving vehicle to stop.

Example 3 is the material loading system of any or all previous examples wherein the motion adjustment command comprises a relative position adjustment command requesting a change in a position of the receiving vehicle relative to the harvester.

Example 4 is the material loading system of any or all previous examples wherein the output generator is configured to generate the representation of the adjustment indicator as an adjustment indicator with an indicator type, the indicator type being at least one of visual adjustment indicator, an audio adjustment indicator, or a haptic adjustment indicator and wherein the user interface mechanism comprises at least one of a visual interface mechanism, an audio interface mechanism, or haptic interface mechanism based on the indicator type.

Example 5 is the material loading system of any or all previous examples wherein the output generator is configured to generate the representation of the adjustment indicator as a visual adjustment indicator that indicates a direction of the requested adjustment to the position of the receiving vehicle relative to the harvester and wherein the user interface mechanism comprises:
a display screen configured to display the visual adjustment indicator.

Example 6 is the material loading system of any or all previous examples wherein the output generator comprises:
an image output generator configured to generate the visual adjustment indicator as an image of the receiving vehicle and a direction indicator indicating a direction of adjustment based on the requested adjustment to the position of the receiving vehicle relative to the material loading vehicle.

Example 7 is the material loading system of any or all previous examples wherein the fill control application is configured to receive a streaming video input from the material loading vehicle indicative of a streaming video image of the receiving vehicle captured by a camera on the material loading vehicle and wherein the image output generator comprises:
a video output generator configured to generate the visual adjustment indicator as a streaming video image output based on the streaming video input; and
a direction indication generator configured to integrate the direction indicator into the streaming video image output.

Example 8 is the material loading system of any or all previous examples wherein the fill control application is configured to receive a static image input from the material loading vehicle indicative of a static image of the receiving vehicle captured by a camera on the material loading vehicle and wherein the image output generator comprises:
a static image output generator configured to generate the visual adjustment indicator as a static image output based on the static image input; and
a direction indication generator configured to integrate the direction indicator into the static image output.

Example 9 is the material loading system of any or all previous examples wherein the image output generator comprises:
a pictorial illustration output generator configured to generate the visual adjustment indicator as a pictorial illustration output indicating a pictorial illustration of the receiving vehicle; and
a direction indication generator configured to integrate the direction indicator into the pictorial illustration output.

Example 10 is the material loading system of any or all previous examples wherein the image output generator is configured to generate the direction indicator as a direction indicator indicating that the requested adjustment is to move the receiving vehicle in a direction comprising at least one of: forward relative to the material loading vehicle, rearward relative to the material loading vehicle, closer to the material loading vehicle, or further away from the material loading vehicle.

Example 11 is the material loading system of any or all previous examples wherein the output generator is configured to generate visual adjustment indicator as a visual fill level indicator indicative of a fill level in the receiving vehicle.

Example 12 is the material loading system of any or all previous examples wherein the display screen comprises:
a display screen that is separate from the mobile device and mounted in an operator compartment of the receiving vehicle.

Example 13 is an agricultural system, comprising:
a fill control system on an agricultural harvester that generates a motion adjustment command indicative of a requested motion adjustment to motion of a receiving vehicle, that receives harvested material from the agricultural harvester;
a communication system;
a connection control system that controls the communication system to establish communication with a mobile device in the receiving vehicle;
a remote application output generator configured to generate an adjustment output to an application on the mobile device in the receiving vehicle based on the motion adjustment command; and
a communication controller that sends the adjustment output to the mobile device using the communication system.

Example 14 is the agricultural system of any or all previous examples wherein the fill control system generates the motion adjustment command as one of a requested change in a position of the receiving vehicle relative to the agricultural harvester and a requested stop of the receiving vehicle.

Example 15 is the agricultural system of any or all previous examples and further comprising an operator interface mechanism and wherein the fill control system comprises:

a manual position adjustment detector configured to detect a manual adjustment input from an operator of the harvester through the operator interface mechanism, and to generate the motion adjustment command based on the manual adjustment input.

Example 16 is the agricultural system of any or all previous examples wherein the fill control system comprises:

an automatic fill control system that automatically generates the motion adjustment command.

Example 17 is the agricultural system of any or all previous examples wherein the fill control system comprises:

a machine synchronization fill control system that automatically generates the motion adjustment command.

Example 18 is a computer implemented method of controlling an agricultural system, comprising:

running a fill control application on a mobile device in a receiving vehicle that receives harvested material from a harvester, the mobile device including a mobile device communication system configured to communicate with a harvester communication system on the harvester;

receiving a motion adjustment command, at the fill control application on the mobile device, from the harvester;

processing the motion adjustment command with the fill control application to identify a requested motion adjustment to motion of the receiving vehicle;

generating a representation of an adjustment indicator indicative of the requested motion adjustment to the motion of the receiving vehicle;

generating interface control signals based on the representation of the adjustment indicator; and generating an operator perceptible output on an operator interface mechanism based on the interface control signals.

Example 19 is the computer implemented method of any or all previous examples wherein generating the operator perceptible output comprises:

generating the operator perceptible output on an operator interface mechanism of the mobile device based on the interface control signals.

Example 20 is the computer implemented method of any or all previous examples wherein generating the operator perceptible output comprises:

generating the operator perceptible output on an operator interface mechanism that is mounted to the receiving vehicle and separate from, but communicably coupled to, the mobile device based on the interface control signals.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A material loading system, comprising:
a fill control application configured to run on a mobile device, the mobile device including a mobile device communication system configured to communicate with a material loading vehicle communication system on a material loading vehicle, the application including:
a command processing system that receives a motion adjustment command from the material loading vehicle, the motion adjustment command comprising a relative position adjustment command requesting a change in position of a receiving vehicle, that receives material from the material loading vehicle, relative to the material loading vehicle; and
an output generator configured to generate a representation of a visual adjustment indicator indicative of a direction of the requested change in the position of the receiving vehicle relative to the material loading vehicle, the visual adjustment indicator including an image of the receiving vehicle and a direction indicator indicating the direction of the requested change in the position of the receiving vehicle relative to the material loading vehicle;
an interface control signal generator configured to generate interface control signals based on the representation of the visual adjustment indicator; and
a user interface mechanism coupled to the output generator, the user interface mechanism comprising a display screen configured to display the visual adjustment indicator based on the interface control signals.

2. The loading system of claim 1 wherein the fill control application is configured to receive a streaming video input from the material loading vehicle indicative of a streaming video image of the receiving vehicle captured by a camera on the material loading vehicle and wherein the output generator comprises:
a video output generator configured to generate the image of the receiving vehicle, of the visual adjustment indicator, as a streaming video image of the receiving vehicle based on the streaming video input; and
a direction indication generator configured to integrate the direction indicator into the streaming video image of the receiving vehicle.

3. The material loading system of claim 1 wherein the fill Control application is configured to receive a static image input from the material loading vehicle indicative of a static image of the receiving vehicle captured by a camera on the material loading vehicle and wherein the output generator comprises:
a static image output generator configured to generate the image of the receiving vehicle, of the visual adjustment indicator, as a static image of the receiving vehicle based on the static image input; and
a direction indication generator configured to integrate the direction indicator into the static image of the receiving vehicle.

4. The material loading system of claim 1 wherein the output generator comprises:
a pictorial illustration output generator configure to generate the image of the receiving vehicle, of the visual adjustment indicator, as a pictorial illustration of the receiving vehicle; and
a direction indication generator configured to integrate the direction indicator into the pictorial illustration of the receiving vehicle.

5. The material loading system of claim 1 wherein the direction indicator comprises a direction indicator indicating the direction of the requested change in the position of the receiving vehicle relative to the material loading vehicle as at least one of: forward relative to the material loading vehicle, rearward relative to the material loading vehicle, closer to the material loading vehicle, or further away from the material loading vehicle.

6. The material loading system of claim 1 wherein the visual adjustment indicator further includes a visual fill level indicator indicative of a fill level in the receiving vehicle.

7. The material loading system of claim 1 wherein the display screen comprises:
  a display screen that is separate from the mobile device and mounted in an operator compartment of the receiving vehicle.

8. A computer implemented method of controlling a material loading system, comprising:
  running a fill control application on a mobile device in a receiving vehicle that receives material from a material loading vehicle, the mobile device including a mobile device communication system configured to communicate with a material loading vehicle communication system on the material loading vehicle;
  receiving a motion adjustment command, at the fill control application on the mobile device, from the material loading vehicle;
  processing the motion adjustment command with the fill control application to identify a requested change in a position of the receiving vehicle relative to the material loading vehicle;
  generating a representation of a visual adjustment indicator indicative of the requested change in the position of die receiving vehicle relative to the material loading vehicle and including an image of the receiving vehicle and a direction indicator indicating the direction of the requested chanced in the position of the receiving vehicle relative to the material loading vehicle;
  generating interface control signals based on the representation of the visual adjustment indicator; and
  generating an operator perceptible output on an operator interface mechanism based on the interface control signals.

9. The computer implemented method of claim 8 wherein generating the operator perceptible output comprises:
  generating the operator perceptible output on an operator interface mechanism of the mobile device based on the interface control signals.

10. The computer implemented method of claim 8 wherein generating, the operator perceptible output comprises:
  generating the operator perceptible output on an operator interface mechanism that is mounted to the receiving vehicle and separate from, but communicably coupled to, the mobile device based on the interface control signals.

* * * * *